(12) United States Patent

Xu et al.

(10) Patent No.: US 12,571,495 B2

(45) Date of Patent: Mar. 10, 2026

(54) DISPLAY MOUNTING SUPPORT

(71) Applicant: Xinadda (Hong Kong) Limited, Hong Kong (CN)

(72) Inventors: Hao Xu, Hong Kong (CN); Lei Sun, Hong Kong (CN)

(73) Assignee: Xinadda (Hong Kong) Limited, Hong Kong (CN)

( * ) Notice: Subject to any disclaimer, the term of this patent is extended or adjusted under 35 U.S.C. 154(b) by 138 days.

(21) Appl. No.: 18/599,815

(22) Filed: Mar. 8, 2024

(65) Prior Publication Data

US 2025/0172232 A1     May 29, 2025

(30) Foreign Application Priority Data

Nov. 24, 2023     (CN) ......................... 202311580766.7
Nov. 24, 2023     (CN) ......................... 202323177365.5

(51) Int. Cl.
*F16M 13/02*          (2006.01)
*F16M 11/04*          (2006.01)
*F16M 11/10*          (2006.01)
*F16M 11/20*          (2006.01)

(52) U.S. Cl.
CPC ........... *F16M 11/046* (2013.01); *F16M 11/10* (2013.01); *F16M 11/2085* (2013.01); *F16M 13/02* (2013.01); *F16M 13/022* (2013.01)

(58) Field of Classification Search
CPC ... A47G 1/24; A47G 1/20; A47G 1/16; A47G 1/1606; A47G 1/613; A47G 1/164; A47G 1/1633; F16M 13/02; F16M 13/022

USPC ....... 248/489, 490, 493, 494, 495, 496, 917, 248/918, 919

See application file for complete search history.

(56) References Cited

U.S. PATENT DOCUMENTS

| | | | | |
|---|---|---|---|---|
| 7,891,622 B1 * | 2/2011 | O'Keene | ................ | F16M 13/02 |
| | | | | 248/920 |
| RE43,696 E * | 10/2012 | Graham | ................. | F16M 11/18 |
| | | | | 248/495 |
| 9,829,151 B1 * | 11/2017 | Stenhouse | .............. | F16M 11/16 |
| 2010/0187385 A1 * | 7/2010 | Luijben | .................. | F16M 11/10 |
| | | | | 248/205.1 |
| 2013/0206943 A1 * | 8/2013 | Molter | ................... | F16M 13/02 |
| | | | | 248/299.1 |

(Continued)

*Primary Examiner* — Alfred J Wujciak
(74) *Attorney, Agent, or Firm* — IP Spring

(57)          ABSTRACT

The present disclosure provides a display mounting support, including a wall plate, two hanging assemblies, and two levelness adjusting members. The wall plate includes a mounting portion. Each of the two hanging assemblies defines a hooking portion for suspending on the mounting portion. The two levelness adjusting members respectively corresponds to two the hanging assemblies. Each levelness adjusting member includes an adjusting plate and an adjusting screw. The adjusting plate defines a threaded hole in a height direction. A threaded rod of the adjusting screw is threaded to the threaded hole of the adjusting plate, and an end of the threaded rod rests against the mounting portion of the wall plate. The adjusting plate is connected to the corresponding hanging assembly. The threaded rod of the adjusting screw screwed into the threaded hole on the corresponding adjusting plate is capable of being changed by rotating the corresponding adjusting screw, so as to adjust a levelness of the display screen connected between the two hanging assemblies.

19 Claims, 16 Drawing Sheets

(56)     References Cited

U.S. PATENT DOCUMENTS

2016/0298806 A1*  10/2016  Lukach  .................. F16M 13/02
2017/0261154 A1*   9/2017  Feldman  .............. F16M 11/041
2020/0132245 A1*   4/2020  Runger  ............. F16M 11/2014
2022/0260201 A1*   8/2022  Amidei  ................ F16M 11/041

* cited by examiner

DISPLAY MOUNTING SUPPORT

CROSS-REFERENCE TO RELATED APPLICATIONS

This application claims priority under 35 U.S.C., § 119 (a) to and the benefit of Chinese Patent Application No. 202311580766.7, filed Nov. 24, 2023, and Chinese Patent Application No. 202323177365.5, filed Nov. 24, 2023, the entire disclosure of which is hereby incorporated by reference.

TECHNICAL FIELD

The present disclosure relates to a technical field of display mounts, and in particular relates to a display mounting support.

BACKGROUND

Display devices such as flat-panel televisions and flat-panel displays have been widely used due to their advantages of high definition, large screens and low weight. Existing display devices such as flat-panel televisions or flat-panel displays are generally mounted on a wall using a wall bracket, which can save space. However, when the wall bracket is mounted on the wall, it is easy for the wall bracket to be mounted out of place with insufficient levelness, in which case it is necessary to remove the wall bracket from the wall to re-adjust the levelness of the wall bracket and then mount it again, which causes inconvenience to the mount of the wall bracket.

SUMMARY

In view of this, the present disclosure provides a display mounting support, to solve at least one of the above mentioned technical problems.

In order to solve the above mentioned technical problems, the technical solutions of the present disclosure are described as follows.

In a first aspect, the present disclosure provides a display mounting support. The display mounting support includes: a wall plate, two hanging assemblies and two levelness adjusting members. The wall plate includes a mounting portion. One side of each of the two hanging assemblies is connected to a backside of a display screen and the other side of each of the two hanging assemblies defines a hooking portion for suspending on the mounting portion. The two levelness adjusting members respectively corresponding to two the hanging assemblies. Each levelness adjusting member includes an adjusting plate and an adjusting screw. The adjusting plate is connected to the corresponding the hanging assembly. The adjusting plate defines a threaded hole in a height direction of the display mounting support. A threaded rod of the adjusting screw is threaded to the threaded hole of the adjusting plate, and an end of the threaded rod rests against the mounting portion of the wall plate. A threaded length of the threaded rod of the adjusting screw screwed into the threaded hole of the corresponding adjusting plate is capable of being changed by rotating the corresponding adjusting screw. The adjusting plate is driven to move in the height direction by the adjusting screw. The adjusting plate moving in the height direction drives the corresponding hanging assembly to move in the height direction so as to adjust a levelness between the two hanging assemblies.

In combination with the first aspect, in some embodiments of the present disclosure, each hanging assembly includes a hooking portion, the adjusting plate is attached to a portion of the corresponding hanging assembly located above the hooking portion.

In combination with the first aspect, in some embodiments of the present disclosure, the hanging assembly includes a hanging strip and a hanging rod; the hanging strip includes at least one sidewall, the hanging rod is connected to the at least one sidewall of the hanging strip, the hooking portion is defined on the sidewall, and the adjusting plate is connected to a portion of the sidewall located above the hooking portion.

In combination with the first aspect, in some embodiments of the present disclosure, the hanging strip further includes a back plate facing the wall plate, the hanging rod is located on one side of the sidewall backing away from the wall plate, the sidewall is connected between the back plate and the hanging rod, the adjusting plate is connected to portions of the back plate, the hanging rod and the sidewall located above the hooking portion.

In combination with the first aspect, in some embodiments of the present disclosure, the hanging strip further includes a back plate facing the wall plate, the adjusting plate is connected to between portions of the sidewall and the back plate located above the hooking portion.

In combination with the first aspect, in some embodiments of the present disclosure, the hanging strip includes a top plate, the top plate connects a top end of the sidewall and a top end of the back plate, the top plate defines a through hole in the height direction, the through hole is arranged with the threaded hole in the height direction, the threaded rod of the adjusting screw passes through the through hole, and threaded to the threaded hole in the adjusting plate and rests against the mounting portion of the wall plate.

In combination with the first aspect, in some embodiments of the present disclosure, the top plate is connected to a side of the top end of the sidewall close to the back plate, and another side of the top end of the sidewall away from the back plate defines a buckle section, the back plate defines a through hole, the back plate, the sidewall and the top plate cooperatively form an accommodating space, the accommodating space is interconnected with the through hole, the adjusting plate includes a first plate section, a second plate section, and a third plate section sequentially connected, the threaded hole is defined on the second plate section, the first plate section protrudes from the third through hole, the second plate section is located in the accommodating space, and the third plate section laps over the buckle section.

In combination with the first aspect, in some embodiments of the present disclosure, the adjusting plate is mounted to the mounting portion, and the hooking portion of the hanging assembly is mounted to the adjusting plate.

In combination with the first aspect, in some embodiments of the present disclosure, the two adjusting plates are mounted on the mounting portion at intervals along a length direction of the display mounting support, one end of each of the two the adjusting plates is rotationally connected to the mounting portion, and the other end of each of the two the adjusting plates is defined with the threaded hole.

In combination with the first aspect, in some embodiments of the present disclosure, the mounting portion includes a hanging plate and a supporting plate, the hanging plate is connected to the supporting plate, the adjusting plate includes a hanging portion and a supporting portion, the supporting portion is connected to the hanging portion, the hanging portion is suspended on the hanging plate, the supporting portion is located above the supporting plate, the threaded hole is defined in the supporting portion.

In combination with the first aspect, in some embodiments of the present disclosure, a cross-section of the hanging portion has an inverted U-shape in the length direction; the supporting portion is connected to one side of the hanging portion in a thickness direction of the display mounting support.

In combination with the first aspect, in some embodiments of the present disclosure, the hanging assembly includes a hanging strip and a hanging rod, the hanging strip includes at least one sidewall, the hanging rod is connected to the at least one sidewall of the hanging strip, the hooking portion is defined on the sidewall; the hanging assembly further includes a pull rod assembly; the pull rod assembly includes a locking plate, a tension spring and a pull cord; the locking plate is located adjacent to a bottom end of the wall plate, the locking plate defines an opening on a side toward a top end of the wall plate; the locking plate is slidably connected to a bottom end of the hanging strip, one end of the tension spring is connected to the bottom end of the hanging strip, the other end of the tension spring is connected to the locking plate, and the pull cord is connected to the locking plate.

In combination with the first aspect, in some embodiments of the present disclosure, wherein the pull rod assembly further includes a guiding member, one of the locking plate and the bottom end of the hanging strip defines a guiding groove along the height direction, the other of the locking plate and the bottom end of the hanging strip defines a fixing hole, the guiding member is slidably connected to the guide groove and connected to the fixing hole.

In combination with the first aspect, in some embodiments of the present disclosure, the hanging assembly includes a hanging strip and a hanging rod, the hanging strip includes at least one sidewall, the hanging rod is connected the at least one sidewall of the hanging strip, the hooking portion is defined on the at least one sidewall, the at least one sidewall of the hanging strip defines a first pitch adjustment slot; the display mounting support also includes a first pitch adjustment member, the hanging rod is slidably connected within the first pitch adjustment slot through the first pitch adjustment member.

In combination with the first aspect, in some embodiments of the present disclosure, the hanging assembly includes a hanging strip and a hanging rod, the hanging strip includes at least one sidewall, the hanging rod is connected to the at least one sidewall of the hanging strip, the hooking portion is defined on the at least one sidewall; the display mounting support further includes a mounting frame; the mounting frame includes an upper horizontal tube and a lower horizontal tube, the mounting portion is provided on the upper horizontal tube; the display mounting support further includes a pipe clamp, a connecting member and a locking member, the pipe clamp is rotatably connected to a bottom end of the hanging strip by the connecting member, the pipe clamp and the hanging strip cooperatively form a space for locking the lower horizontal tube.

In combination with the first aspect, in some embodiments of the present disclosure, one of the bottom end of the hanging strip and the pipe clamp defines a sliding groove along the height direction, the other of the bottom end of the hanging strip and the pipe clamp defines a connecting hole, and the connecting member is slidably connected within the sliding groove and is connected within the connecting hole, the pipe clamp defines a limiting slot along the height direction, and the locking member is slidably connected within the limiting slot and connected to the hanging rod.

In combination with the first aspect, in some embodiments of the present disclosure, the display mounting support further includes a telescopic frame and a second pitch adjustment member, the telescopic frame is connected between the wall plate and the second pitch adjustment member; the mounting frame is connected to the second pitch adjustment member.

In a second aspect, the present disclosure provides a display mounting support, wherein the display mounting support includes a wall plate and two hanging assemblies. The wall plate includes a top end and a bottom end opposite to the top end, the top end includes a mounting portion. Each of the two hanging assemblies includes a hanging strip and a hanging rod, wherein the hanging rod is connected to the hanging strip, the hanging strip includes at least one sidewall, a top plate, and a back plate facing the wall plate; the top plate connects a top end of the sidewall and a top end of the back plate, the sidewall defines a hooking portion, the hooking portion is configured to suspend on the mounting portion, the top plate defines a through hole along a height direction of the display mounting support. The hanging assembly further includes a pull rod assembly; the pull rod assembly includes a locking plate, a tension spring and a pull cord; the locking plate is located adjacent to a bottom end of the wall plate; the locking plate defines an opening toward a top end of the wall plate; the locking plate is slidably connected to a bottom end of the hanging strip, one end of the tension spring is connected to the bottom end of the hanging strip, the other end of the tension spring is connected to the locking plate, and the pull cord is attached to the locking plate.

In combination with the second aspect, in some embodiments of the present disclosure, the at least one sidewall of the hanging strip further defines a first pitch adjustment slot; the display mounting support further includes a first pitch adjustment member; the hanging rod is slidably connected to the first pitch adjustment slot through the first pitch adjustment member.

In combination with the second aspect, in some embodiments of the present disclosure, the pull rod assembly further includes a guiding member; one of the locking plate and the bottom end of the hanging strip defines a guiding groove, the other of the locking plate and the bottom end of the hanging strip defines a fixing hole, the guiding member is slidably connected within the guide groove and connected to the fixing hole.

In combination with the second aspect, in some embodiments of the present disclosure, the display mounting support further includes two levelness adjusting members; the two the levelness adjusting members corresponds to the two hanging assemblies respectively, each of the two levelness adjusting members includes an adjusting plate and an adjusting screw, the adjusting plate defines a threaded hole in the height direction of the display mounting support, a threaded rod of the adjusting screw passes through the through hole and threaded to the threaded hole in the adjusting plate, and an end of the adjusting screw rests against the mounting portion of the wall plate, the adjusting plate is connected to the corresponding hanging strip; wherein the length of threaded rod of the adjusting screw screwed into the threaded hole of the corresponding adjusting plate is capable of being changed by rotating the corresponding adjusting screw; the adjusting plate is driven to move in the height direction by the adjusting screw; and the adjusting plate moving in the height direction drives the corresponding hanging assembly to move in the height direction to adjust a levelness between the two hanging assemblies.

In combination with the second aspect, in some embodiments of the present disclosure, the top plate is connected to a side of the top end of the sidewall close to the back plate, and another side of the top end of the sidewall away from the back plate defines a buckle section, the back plate defines a through hole, the back plate, the sidewall and the top plate cooperatively form an accommodating space, the accommodating space is interconnected with the through hole, the adjusting plate includes a first plate section, a second plate section, and a third plate section sequentially connected, the first plate section protrudes from the third through hole, the second plate section is located in the accommodating space, and the third plate section laps over the buckle section, the threaded hole is defined on the second plate section.

Compared with the prior art, the beneficial effect of the present disclosure is as follows:

Therefore, when the wall plate has been mounted on the wall, and the levelness of the wall plate is not enough, the levelness between the two hanging assemblies can be adjusted by rotating the respective adjusting screws of the two levelness adjusting members, without the need to dismantle the wall plate for re-mounting, simplifying the installation process.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, those of ordinary skilled in the art may also obtain other drawings based on these drawings without any creative efforts.

DETAILED DESCRIPTION OF ILLUSTRATED EMBODIMENTS

Embodiments of the present disclosure are described in detail below. Examples of the embodiments are shown in the accompanying drawings. The same or similar labeling throughout denotes the same or similar elements or elements having the same or similar functions. The embodiments described below by reference to the accompanying drawings are exemplary and are intended to be configured to explain the present disclosure and are not to be construed as limiting the present disclosure.

Furthermore, the terms "first" and "second" are used for descriptive purposes only and are not to be understood as indicating or implying relative importance or implicitly specifying the number of technical features indicated. Therefore, a feature defined with "first" or "second" may include one or more such features, either explicitly or implicitly. In the description of the present disclosure, "more than one" means two or more, unless otherwise expressly and specifically limited.

In the present disclosure, unless otherwise expressly specified and limited, the terms "connected", "fixed", and so on are to be understood broadly, e.g., they may be fixedly connected, removably connected, or integrally connected; they may be mechanically connected or electrically connected; they may be directly connected or indirectly connected through an intermediate medium; they may be interconnected within two elements or an interactive relationship between two elements. For those of ordinary skill in the art, the specific meaning of the above terms in the present disclosure may be understood on a case-by-case basis.

Figure 1:
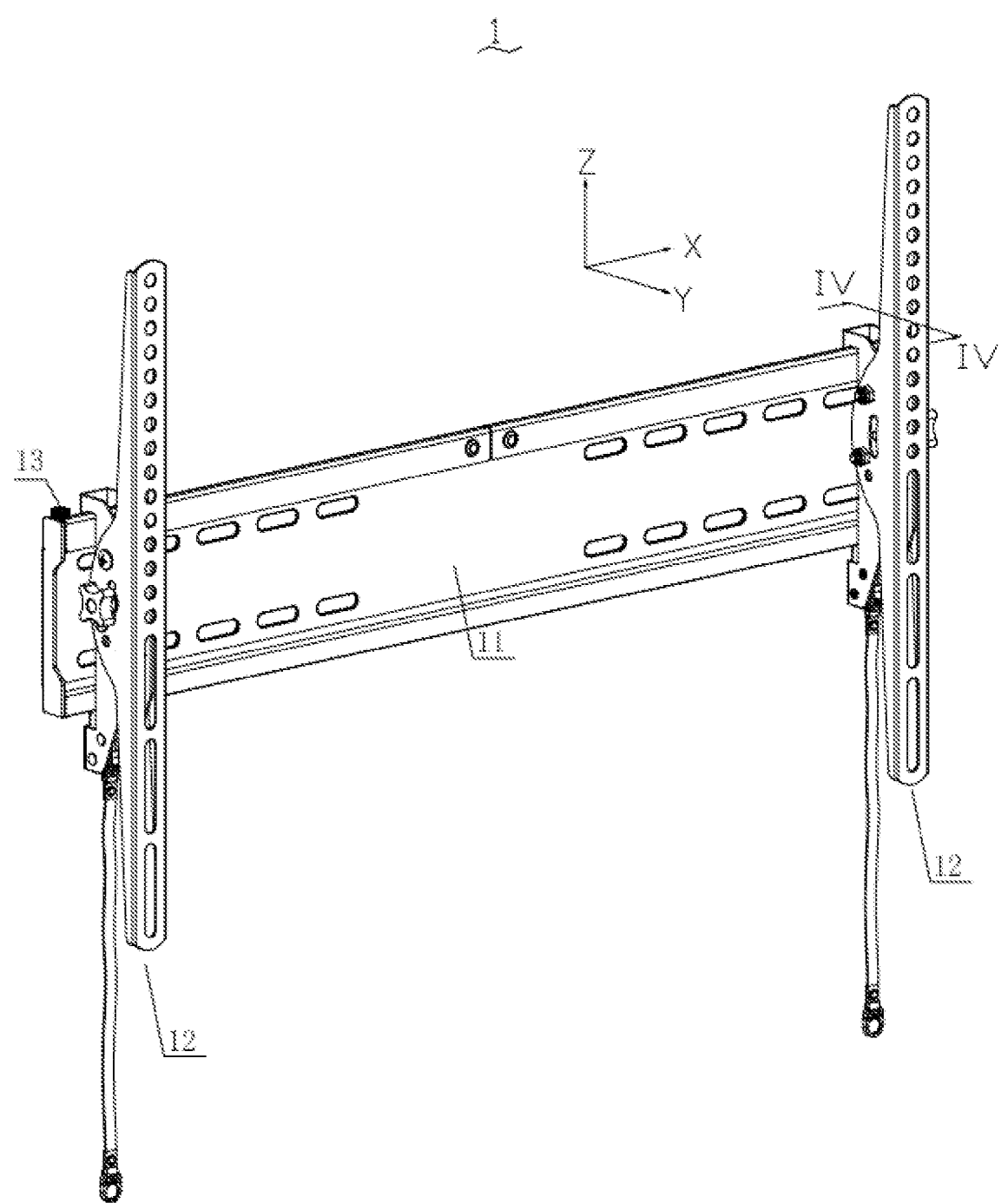
FIG. 1 illustrates a schematic view of a three-dimensional structure of a display mounting support in accordance with one embodiment of the present disclosure.
Figure 2:
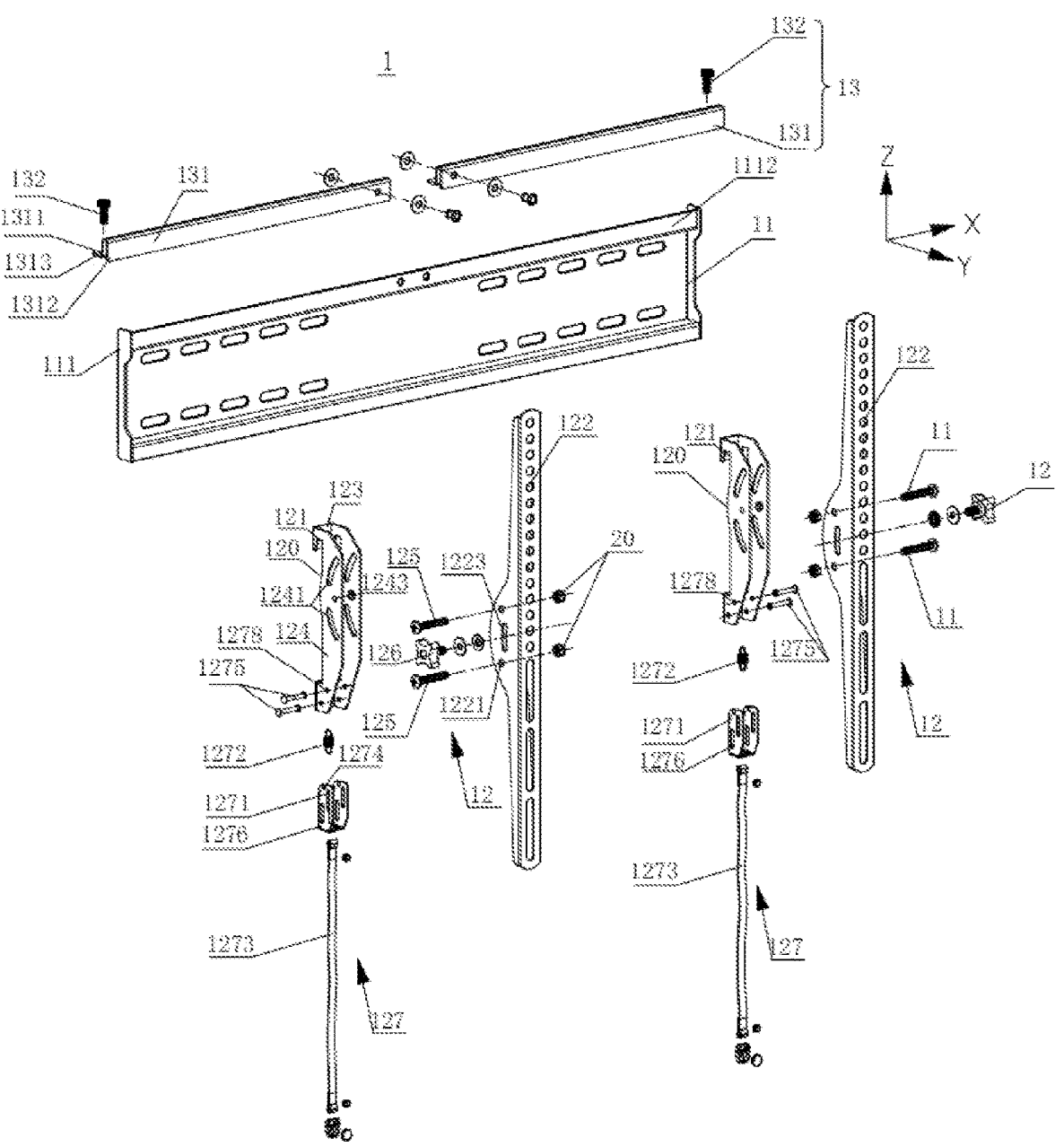
FIG. 2 illustrates an exploded view of the display mounting support in FIG. 1.

Referring to FIGS. 1 and 2, FIG. 1 illustrates a schematic view of a three-dimensional structure of a display mounting support in accordance with one embodiment of the present disclosure; FIG. 2 illustrates an exploded view of the display mounting support in FIG. 1.

For convenience of description, a front-back direction of the display mounting support 1 shown in FIG. 1 is defined as a Y-axis direction, i.e., a thickness direction, a left-right direction of the display mounting support 1 shown in FIG. 1 is defined as an X-axis direction, i.e., a length direction, and a height direction of the display mounting support 1 shown in FIG. 1 is defined as a Z-axis direction. The orientation terms such as "top", "bottom", "left", "right", "front", and "back" mentioned in the description of the display mounting support 1 in embodiments of the present disclosure are based on the orientation shown in FIG. 1 of the accompanying drawings of the specification, with a positive direction of Z-axis as the "top", a negative direction of Z-axis as the "bottom", a negative direction of X-axis as the "left" and a positive direction of the X-axis as "right", a positive direction of Y-axis as the "front" and a negative direction of the Y-axis as "back", which does not constitute a limitation of the display mounting support 1 in an actual application scenario.

As shown in FIGS. 1 and 2, the display mounting support 1 includes a wall plate 11, two hanging assemblies 12, and two levelness adjusting members 13. The wall plate 11 is configured to be mounted on a wall. The two hanging assemblies 12 are configured to be fixed to different positions on a backside of a display screen and further hung on different positions of the wall plate 11 respectively. The two levelness adjusting members 13 are set corresponding to the two hanging assemblies 12 respectively. The two levelness adjusting members 13 are respectively configured to adjust height of the two hanging assemblies 12 relative to the wall plate 11 in the Z-axis direction, so as to adjust the levelness between the two hanging assemblies 12, thereby adjusting the levelness of the display screen mounted on the two hanging assemblies 12. The wall plate 11 includes a mounting portion 111. In some embodiments, the mounting portion 111 is located on a top portion of wall plate 11 and extends along the X-axis direction. It will be understood that in other embodiments, the mounting portion 111 may be located in a middle of the wall plate 11 or in other locations along the Z-axis direction, without limitation herein. Each hanging assembly 12 includes a hooking portion 121 on a side facing the wall plate 11. Each hanging assembly 12 is suspended on the mounting portion 111 by the hooking portion 121. The two hanging assemblies 12 can slide on the mounting portion 111 of the wall plate 11 along the X-axis direction, so that the distance between the two hanging assemblies 12 can be adjusted for mounting display screens with different sizes.

As shown in FIG. 1, the two levelness adjusting members 13 are mounted to different positions of the top portion of the wall plate 11. The structure of the two levelness adjusting members 13 is the same, therefore, the structure of one of the two levelness adjusting members 13 is described in detail as an example. As shown in FIG. 2, the levelness adjusting member 13 includes an adjusting plate 131 and an adjusting screw 132. The adjusting plate 131 defines a threaded hole 1311 in the Z-axis direction. A threaded rod of the adjusting screw 132 is threaded to the threaded hole 1311 of the adjusting plate 131, and an end of the adjusting screw 132 passes through the threaded hole 1311 of the adjusting plate 131 and rests against the mounting portion 111 of the wall plate 11. The adjusting plate 131 is connected to the corresponding hanging assembly 12. Since the wall plate 11 is fixed to the wall, the position of the mounting portion 111 itself does not change, therefore, rotating the adjusting screw 132 changes a threaded length of the threaded rod of the adjusting screw 132 screwed into the corresponding threaded hole 1311, which in turn drives at least one end of the adjusting plate 131 to move in the Z-axis direction relative to the mounting portion 111, and the movement of the at least one end of the adjusting plate 131 in the Z-axis direction drives the corresponding hanging assembly 12 to move in the Z-axis direction relative to the wall plate 11, and the two hanging assemblies 12 can move the same distance or different distances relative to the wall plate 11 in the Z-axis direction, so as to adjust the levelness between the two hanging assemblies 12, thereby adjusting the levelness of the display screen mounted on the two hanging assemblies 12.

Therefore, when the wall plate 11 has been mounted on the wall, and the levelness of the wall plate 11 is not enough, the levelness between the two hanging assemblies 12 can be adjusted by rotating the respective adjusting screws 132 of the two levelness adjusting members 13, without the need to dismantle the wall plate 11 for re-mounting, simplifying the installation process.

Referring to FIG. 2 again, in some embodiments, the two adjusting plates 131 are mounted on the mounting portion 111 at intervals along the X-axis direction, one end of each adjusting plate 131 is rotationally connected to the mounting portion 111, and the other end of each adjusting plate 131 defines the threaded hole 1311. In this embodiment, ends of the two adjusting plates 131 adjacent to each other are respectively rotationally connected to the mounting portion 111, and the other ends of the two adjusting plates 131 away from each other each defines the threaded hole 1311. In other embodiments, ends of the two adjusting plates 131 away from each other are respectively rotationally connected to the mounting portion 111, and the other ends of the two adjusting plates 131 close to each other each defines the threaded hole 1311. Alternatively, one end of each of the two adjusting plates 131 along the X-axis direction is rotationally connected to the mounting portion 111, and the other end of each of the two adjusting plates 131 along the X-axis direction defines the threaded hole 1311, without limitation herein. The rotational connection between the adjusting plate 131 and the mounting portion 111 may be achieved by rivets, spindles, bolts, snaps, cramps, and the like. In other embodiments, the rotational connection between the adjusting plate 131 and the mounting portion 111 may also be that the adjusting plate 131 is clamped to the mounting portion 111, but there is no a third-party connecting member between the two, which is not limited herein.

Therefore, when the two adjusting plates 131 respectively make a rotational movement relative to the mounting portion 111, the two hanging assemblies 12 can be driven respectively to move along the Z-axis direction relative to the wall plate 11, so as to adjust the levelness between the two hanging assemblies 12. Since one end of each adjusting plate 131 is rotationally connected to the mounting portion 111, the mounting stability of the adjusting plate 131 on the mounting portion 111 can be increased.

Figure 3:
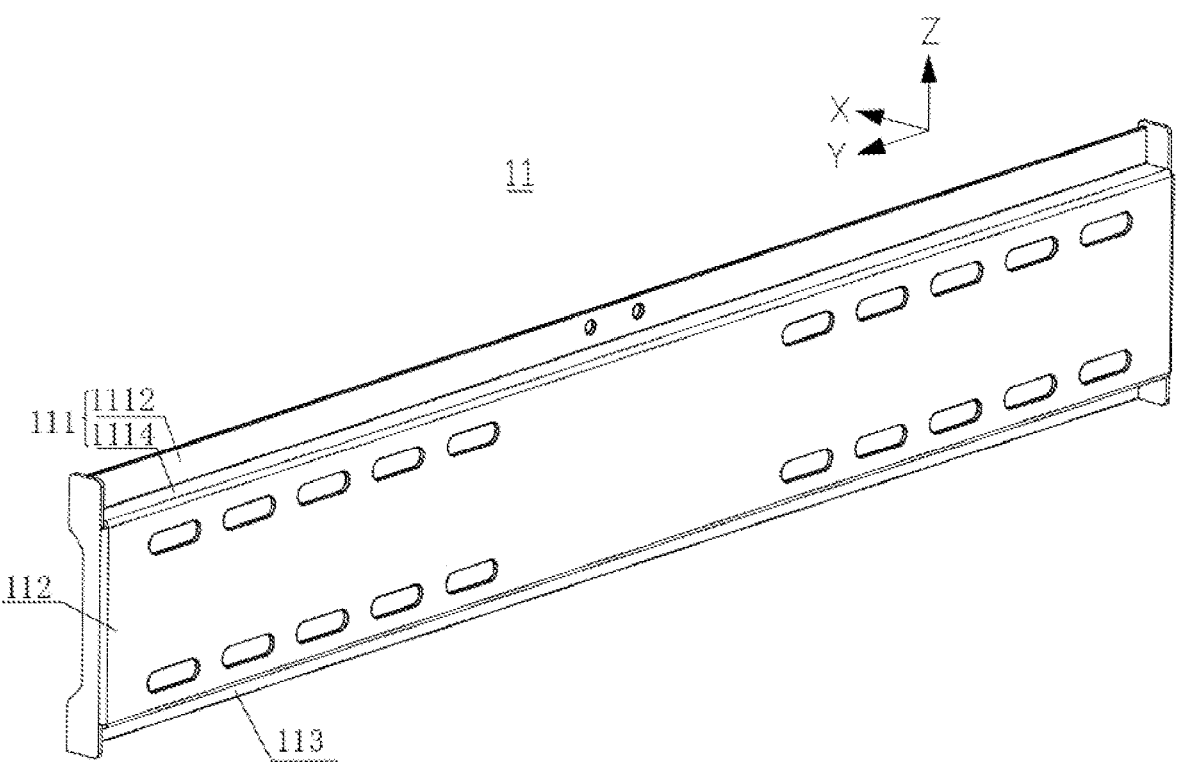
FIG. 3 illustrates a schematic view of a three-dimensional structure of a wall plate in FIG. 2 from another view.

In some embodiments, referring to FIG. 3, the wall plate 11 includes the mounting portion 111, a mounting plate 112, and a locking portion 113. The mounting portion 111, the mounting plate 112, and the locking mounting plate 112 are arranged along the Z-axis direction. The mounting plate 112 is connected between the mounting portion 111 and the locking portion 113. The mounting plate 112 defines a plurality of mounting holes for mounting the wall plate 11 on the wall. The mounting portion 111 and the locking portion 113 are located further away from the wall relative to the mounting plate 112, thereby forming a mounting space between the mounting portion 111 and the wall, and a locking space between the locking portion 113 and the wall, respectively. Specifically, the mounting portion 111 includes a hanging plate 1112 and a supporting plate 1114. The hanging plate 1112 is substantially vertical, and the supporting plate 1114 is substantially horizontal. The hanging plate 1112 is connected to the supporting plate 1114. The supporting plate 1114 is connected to a top end of the mounting plate 112. In this embodiment, the hanging plate 1112 is vertically connected to one side of the supporting plate 1114 along the Y-axis direction of the display mounting support 1, thus, the mounting portion 111 is substantially L-shaped. It can be understood that in other embodiments, the hanging plate 1112 may be connected at a relatively oblique angle to the supporting plate 1114 at a substantially central position along the Y-axis direction of the display mounting support 1, without limitation herein. The locking portion 113 is connected to a bottom end of the mounting plate 112. The locking portion 113 and the mounting portion 111 are substantially axisymmetric relative to the mounting plate 112.

Figure 4:
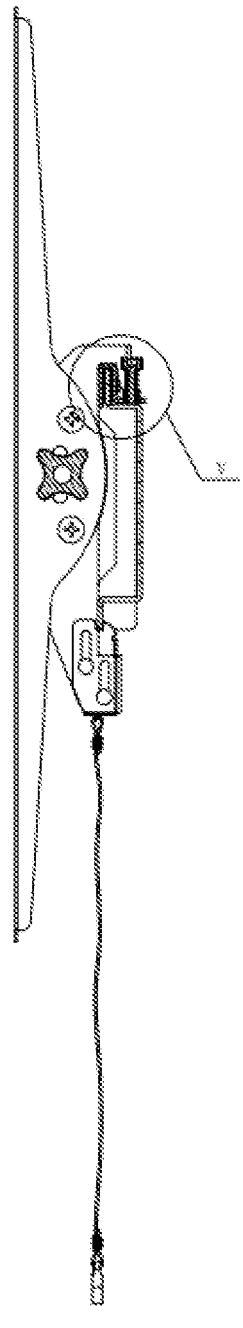
FIG. 4 illustrates a cross-sectional view of FIG. 1.
Figure 5:
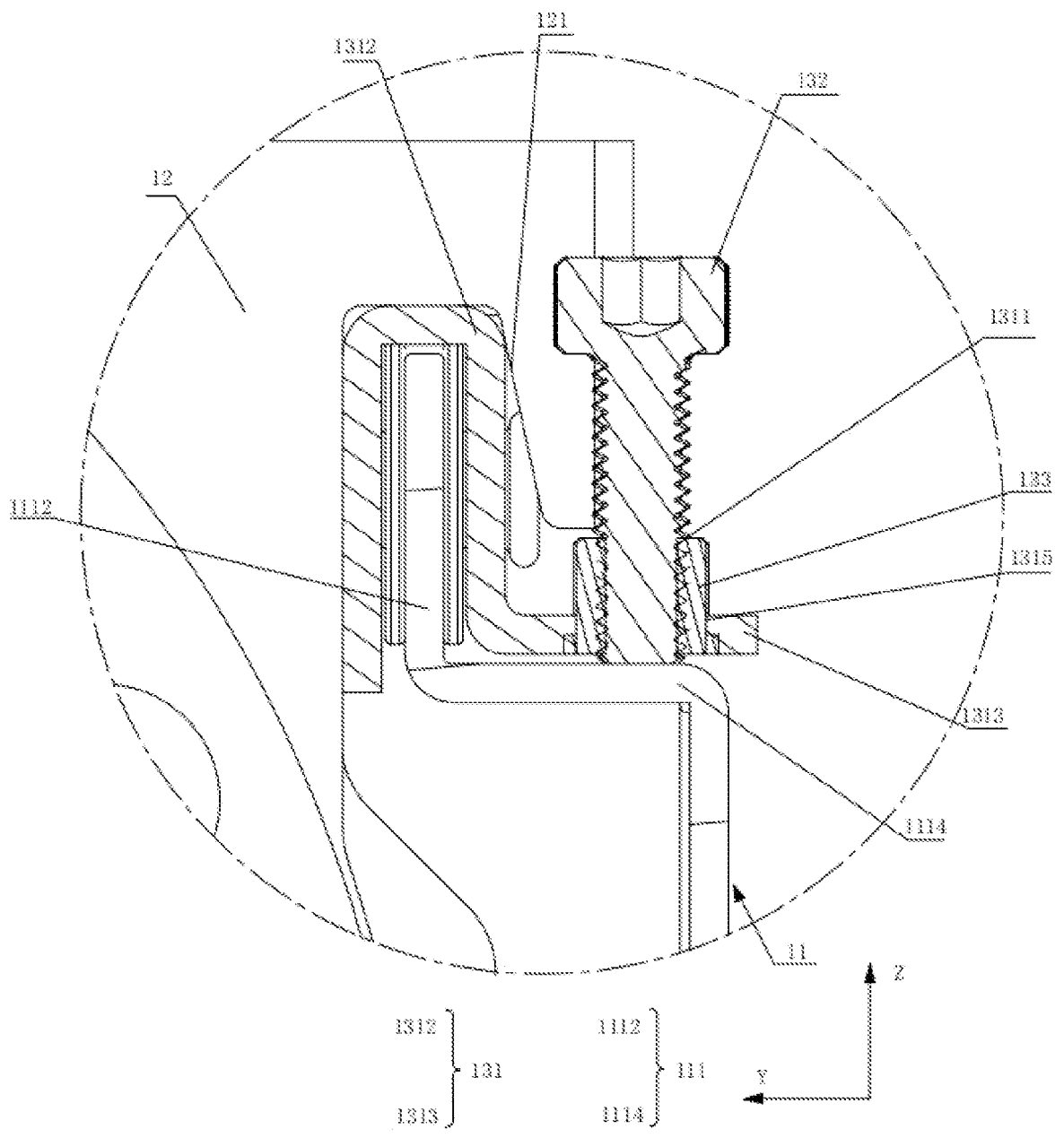
FIG. 5 illustrates a partially enlarged view of FIG. 4 at V.

As shown in FIGS. 4 and 5, the adjusting plate 131 includes a hanging portion 1312 and a supporting portion 1313. A cross-section of the hanging portion 1312 has an inverted U-shape in the X-axis direction. The supporting portion 1313 is connected to one side of the hanging portion 1312 in the Y-axis direction. The hanging portion 1312 is suspended on the hanging plate 1112 of the mounting portion 111. The supporting portion 1313 is located on the supporting plate 1114 of the mounting portion 111. The threaded hole 1311 is defined on the supporting portion 1313.

Therefore, the hanging portion 1312 of the adjusting plate 131 can be mounted to the hanging plate 1112 of the mounting portion 111, and the hanging assembly 12 is mounted to the hanging portion 1312 of the adjusting plate 131 through the hooking portion 121, so that the movement of the adjusting plate 131 relative to the mounting portion 111 in the Z-axis direction can drive the hanging assembly 12 to move along the Z-axis direction relative to the wall plate 11, thereby adjusting the levelness between the two hanging assemblies 12. Moreover, since the hanging portion 1312 of the adjusting plate 131 can be mounted to the hanging plate 1112 of the mounting portion 111, and the adjusting plate 131 and the mounting portion 111 are in a shape of an elongated strip as a whole, thus, the adjusting plate 131 has a large contact area with the mounting portion 111, with good contact stability and high load-bearing capacity.

In some embodiments, the levelness adjusting member 13 further includes a nut 133. The supporting portion 1313 defines a first through hole 1315. The nut 133 is mounted within the first through hole 1315. The nut 133 and the first through hole 1315 are stop-rotationally connected. The nut 133 defines the threaded hole 1311. The threaded hole 1311 is threadedly connected to the threaded rod of the adjusting screw 132. The nut 133 is protruded from the first through hole 1315 to one side of the supporting portion 1313 away from the supporting plate 1114, so that the height of the supporting portion 1313 in the Z-axis direction can be smaller than that of the nut 133 in the Z-axis direction. Furthermore, with the nut 133, a sufficient threaded connection length can be provided for the threaded connection of the adjusting screw 132 to the threaded hole 1311, which also saves a material cost of the supporting portion 1313 and reduces a total product weight.

In other embodiments, the nut 133 may be omitted and the threaded hole 1311 may be directly defined in the supporting portion 1313, without limitation herein.

In some embodiments, referring again to FIG. 2, each hanging assembly 12 includes a hanging strip 120 and a hanging rod 122. The hooking portion 121 is provided on the hanging strip 120. The hanging rod 122 is connected to the hanging strip 120. The hanging rod 122 defines a plurality of mounting holes for fixing to the backside of the display screen.

Therefore, the hanging strip 120 and the hanging rod 122 are set separately, and other elements can be provided between the hanging strip 120 and the hanging rod 122 to realize more functions.

In some embodiments, the hanging strip 120 includes a back plate 123 facing the wall plate 11 and at least one sidewall 124 connected to the back plate 123. In this embodiment, the number of the at least one sidewall 124 is two, and the two sidewalls 124 are connected to the opposite sides of back plate 123 in the X-axis direction. In other embodiments, the number of the at least one sidewall 124 may be one or more and are not limited herein. The sidewall 124 is set with the hooking portion 121 adjacent to a top end of the hanging strip 120.

In some embodiments, the hanging rod 122 also correspondingly includes two sidewalls. Therefore, the hanging rod 122 has a U shape when viewed from top and bottom. Accordingly, the hanging strip 120 also has a U shape. An U-shaped opening of the hanging rod 122 is located face-to-face with an U-shaped opening of the hanging strip 120, and the two sidewalls 124 of the hanging strip 120 can be inserted between the two sidewalls of the hanging rod 122.

In some embodiments, the sidewall 124 of the hanging strip 120 defines a first pitch adjustment slot 1241. In this embodiment, the first pitch adjustment slot 1241 includes one or more segments of a first arcuate slot, and a center of the first arcuate slot is located on a side of the first arcuate slot away from the wall plate 11. The display mounting support 1 further includes a first pitch adjustment member 125. The sidewall of the hanging rod 122 correspondingly defines a first fixing hole 1221. The hanging rod 122 is slidably connected to the first pitch adjustment slot 1241 and threaded to the first fixing hole 1221 by the first pitch adjustment member 125.

Therefore, the hanging rod 122 can be rotated such that when the hanging rod 122 drives the first pitch adjustment member 125 to slide within the first pitch adjustment slot 1241 of the hanging strip 120, the hanging rod 122 may have different pitch tilt angles relative to the hanging strip 120.

In some embodiments, the hanging assembly 12 further includes a safety locking member 126. The sidewall 124 defines a second fixing hole 1243. The sidewall of the hanging rod 122 correspondingly defines a locking slot 1223. The locking slot 1223 includes a section of second arcuate slot. A center of the second arcuate slot is located on one side of the second arcuate slot away from the wall plate 11. The safety locking member 126 may be threaded into the second fixing hole 1243 after passing through the locking slot 1223.

Therefore, by means of the safety locking member 126, the hanging rod 122 can be further securely locked to the hanging strip 120, making the locking of the hanging rod 122 relative to the hanging strip 120 safer and more reliable, with better load-bearing performance.

It can be understood that in some embodiments, the first pitch adjustment slot 1241, the first pitch adjustment member 125 and the first fixing hole 1221 are one adjustment group, and the safety locking member 126, the second fixing hole 1243 and the locking slot 1223 are another adjustment group, and the two adjustment groups may be present at the same time or one of the two adjustment groups may be omitted.

It can be understood that in other embodiments, the tilt angle adjustment may also be realized by other structures, which will not be limited herein.

In some embodiments, as shown in FIG. 2, the hanging assembly 12 further includes a pull rod assembly 127. The pull rod assembly 127 includes a locking plate 1271, a tension spring 1272, and a pull cord 1273. The locking plate 1271 defines an opening 1274 on a side toward the top end of the wall plate 11. In some embodiments, the opening 1274 is substantially U-shaped. In other embodiments, the opening 1274 may be in other shapes and is not limited herein. The locking plate 1271 is slidably connected to the bottom end of the hanging strip 120, one end of the tension spring 1272 is connected to the bottom end of the hanging strip 120, and the other end of the tension spring 1272 is connected to the locking plate 1271, and the pull cord 1273 is connected to the locking plate 1271. When the hanging assembly 12 is mounted to the wall plate 11, the opening 1274 of the locking plate 1271 engages with the locking portion 113 of the wall plate 11.

Therefore, when it is necessary to remove the hanging assembly 12 from the wall plate 11, the pull cord 1273 is pulled downwardly, the opening 1274 of the locking plate 1271 is disengaged from the locking portion 113 of the wall plate 11, and the hanging assembly 12 can be removed from the wall plate 11. Conversely, when the hanging assembly 12 needs to be mounted on the wall plate 11, the pull cord 1273 can be pulled downwardly so that when a position of the opening 1274 of the locking plate 1271 is lower than the locking portion 113 of the wall plate 11, the pull cord 1273 is loosened, and the elastic restoring force of the tension spring 1272 drives the locking plate 1271 to move upwardly so that the opening 1274 of the locking plate 1271 engages with the locking portion 113 of the wall plate 11.

In some embodiments, as shown in FIG. 2, the pull rod assembly 127 further includes a guiding member 1275. The locking plate 1271 defines a guide groove 1276 along the Z-axis direction. A bottom end of the hanging strip 120 defines a third fixing hole 1278. The guiding member 1275 can be slidably disposed in the guide groove 1276 and connected to the third fixing hole 1278.

Therefore, the mating of the guiding member 1275 with the guide groove 1276 may provide better guidance for the sliding connection of the locking plate 1271 relative to hanging strip 120 in the Z-axis direction.

In some embodiments, the number of the guiding member 1275 is two or more, and accordingly, the number of the guide groove 1276 is correspondingly two or more, and the two or more guide grooves 1276 are defined at staggered intervals.

Therefore, even if the sidewall of the locking plate 1271 defines two or more guide grooves 1276, the overall structural strength of the locking plate 1271 can be ensured.

In other embodiments, the guide groove 1276 may be defined at the bottom end of the hanging strip 120, and the third fixing hole 1278 may be defined on the locking plate 1271, without limitation herein.

In some embodiments, one end of the tension spring 1272 is connected to the bottom end of the hanging strip 120 by connecting to the guiding member 1275.

Figure 6:
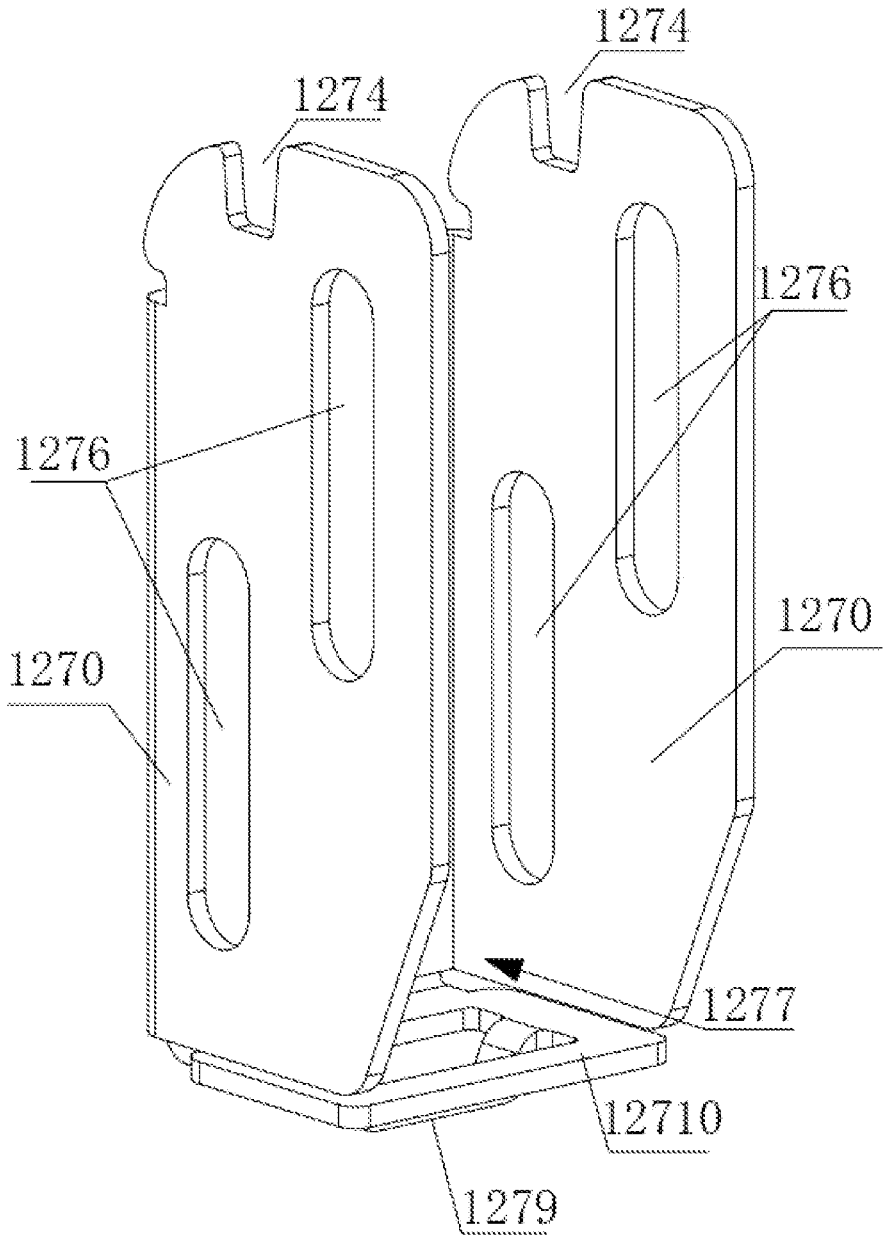
FIG. 6 illustrates a schematic view of a three-dimensional structure of a locking plate in FIG. 2.

In some embodiments, referring to FIG. 6, the locking plate 1271 includes a side plate 1270, a back plate (not shown), and a bottom plate 12710. The side plate 1270 is connected to the back plate and the bottom plate 12710. The guide groove 1276 is defined on the side plate 1270. The side panel 1270, the back plate, and the bottom plate 12710 cooperatively form a receiving space 1277. The tension spring 1272 is located within the receiving space 1277. The bottom plate 12710 is partially hollowed out and partially formed a fixing strip 1279. The other end of the tension spring 1272 and the pull cord 1273 are connected to the fixing strip 1279.

In some embodiments, the fixing strip 1279 is bent from the bottom plate 12710 to a side away from the receiving space 1277.

Therefore, it is convenient to connect the other end of the tension spring 1272 and the pull cord 1273 to the fixing strip 1279.

Figures 7, 8:
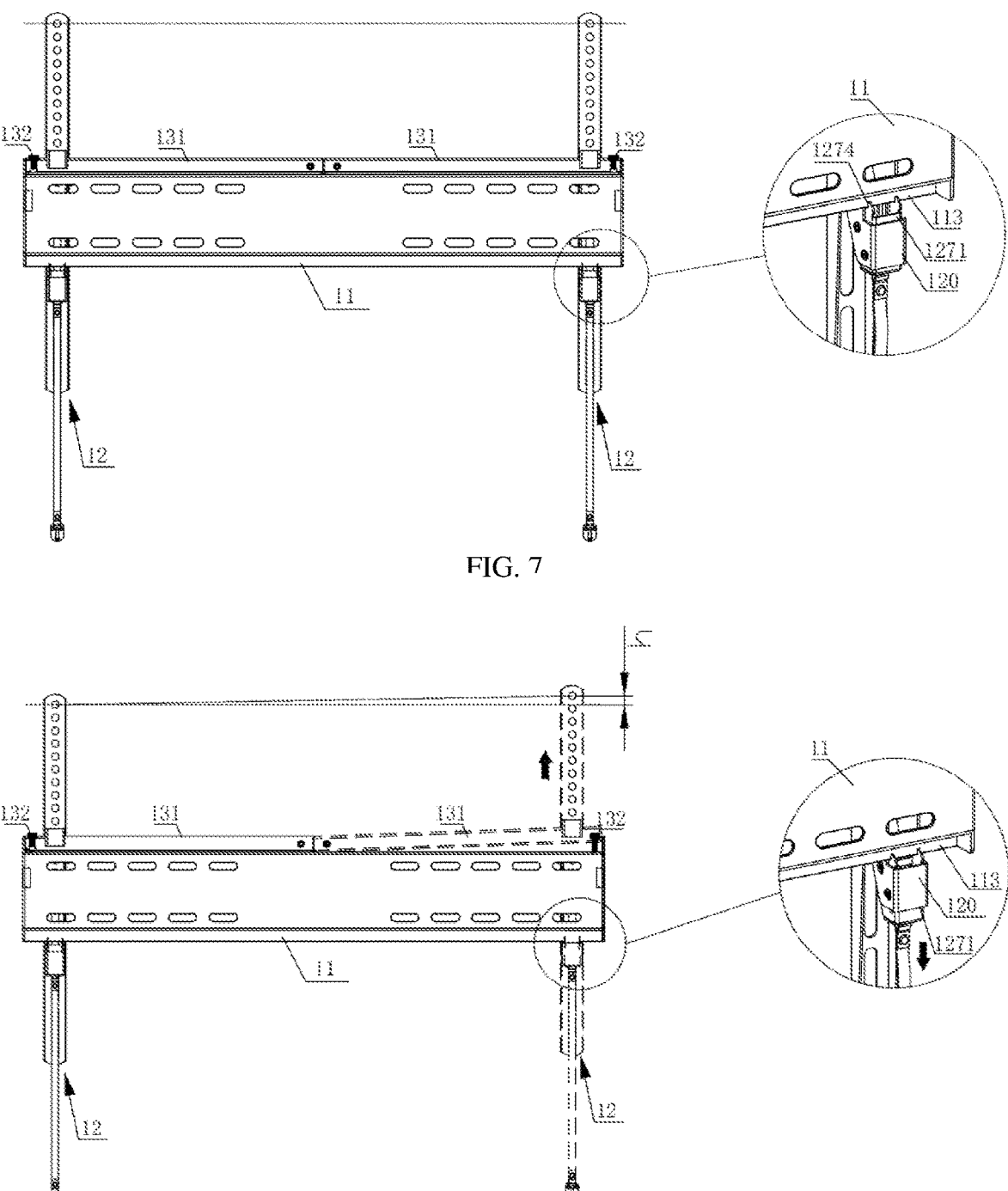
FIG. 7 illustrates a schematic view of the display mounting support in accordance with one embodiment of the present disclosure for adjusting a levelness.
FIG. 8 illustrates a schematic view of the display mounting support in accordance with one embodiment of the present disclosure for adjusting a levelness.

Referring to FIG. 7, when the wall plate 11 itself is mounted horizontally, the hanging assembly 12 is mounted on the wall plate 11 and the levelness between the two hanging assemblies 12 is satisfied with requirement. At this time, the threaded ends of the respective adjusting screws 132 of the two levelness adjusting members 13 screw into the corresponding threaded hole 1311 for equal lengths, and the two hanging assemblies 12 move the same distance relative to the wall plate 11 in the Z-axis direction, and the locking plate 1271 extends from the bottom end of the hanging strip 120 by a first length.

Referring to FIG. 8, when the wall plate 11 is mounted in a state tilted downwardly to the right, the adjusting plate 131 of the levelness adjusting member 13 corresponding to the right-side hanging assembly 12 needs to be lifted upwardly by a height h in order to offset the downwardly tilted height of the right side of the wall plate 11, so that the two hanging assemblies 12 are in a horizontal state. Therefore, the adjusting screw 132 can be rotated to increase the length of the threaded rod of the adjusting screw 132 screwed into the adjusting plate 131 by the height h, thereby lifting the adjusting plate 131 upward by the height h. When the right-side adjusting plate 131 drives the right-side hanging assembly 12 upwardly to lift height h, the locking plate 1271 is pushed downwardly in a reverse direction, and the length of the locking plate 1271 protruding from the bottom end of the hanging strip 120 is a sum of the first length and the height h.

Figure 9:
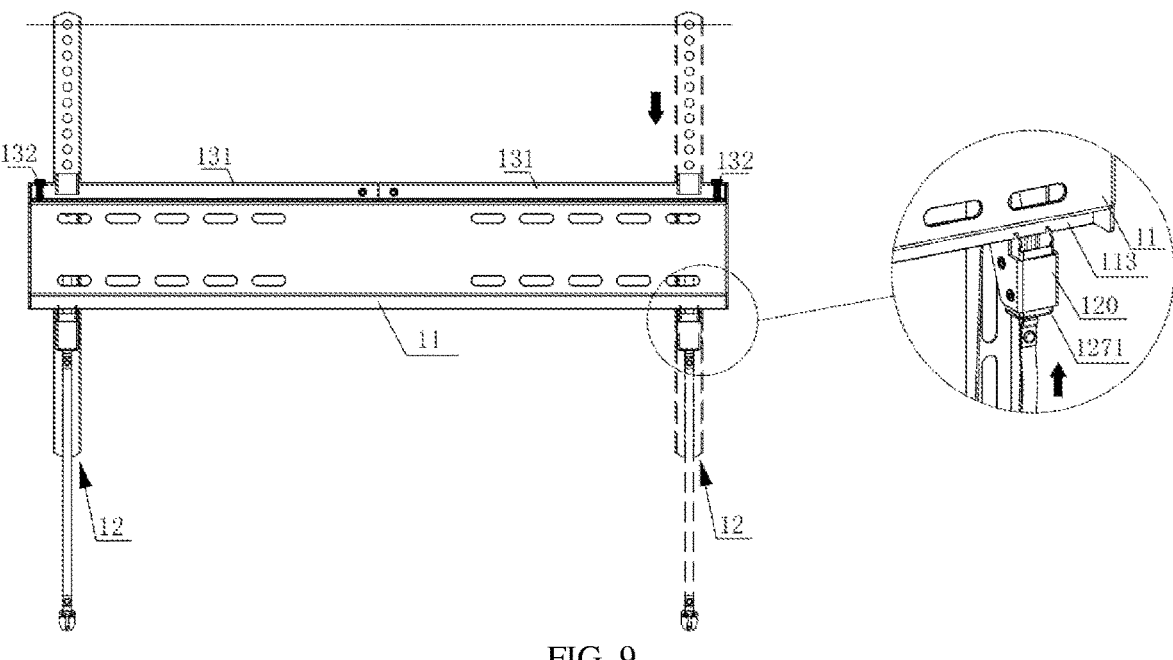
FIG. 9 illustrates a schematic view of the display mounting support in accordance with one embodiment of the present disclosure for adjusting a levelness.

Referring to FIG. 9, which shows an inverse process of FIG. 8, when the adjusting screw 132 is rotated in a reverse direction to reduce a length of the threaded rod of the adjusting screw 132 screwed into the adjusting plate 131, the height of the lifted adjusting plate 131 can be lowered, accordingly, due to the elastic restoring force of the tension spring 1272, the length of the locking plate 1271 protruding from the bottom end of the hanging strip 120 will be reduced accordingly.

Figure 10:
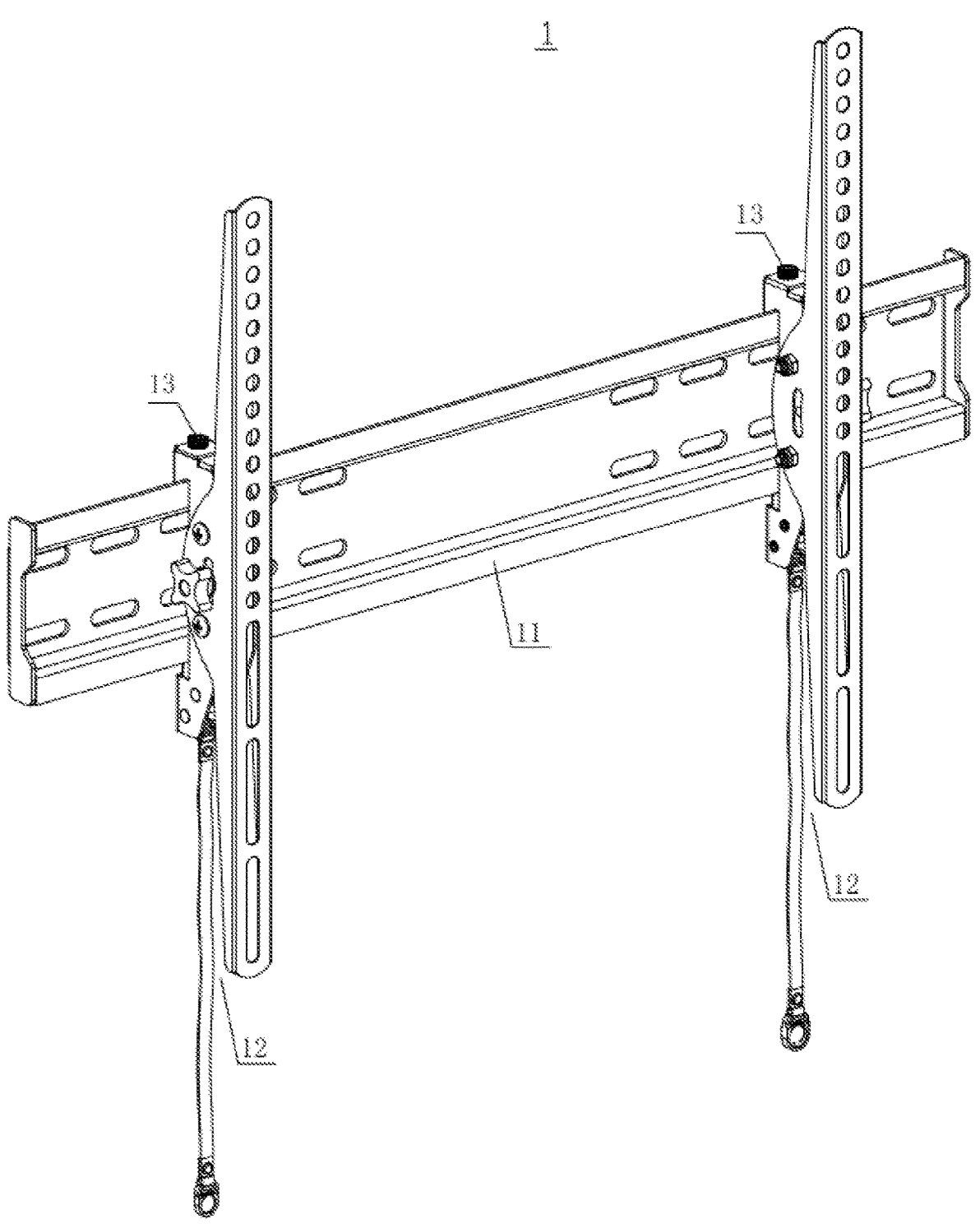
FIG. 10 illustrates a schematic view of a three-dimensional structure of a display mounting support in accordance with another embodiment of the present disclosure.
Figure 11:
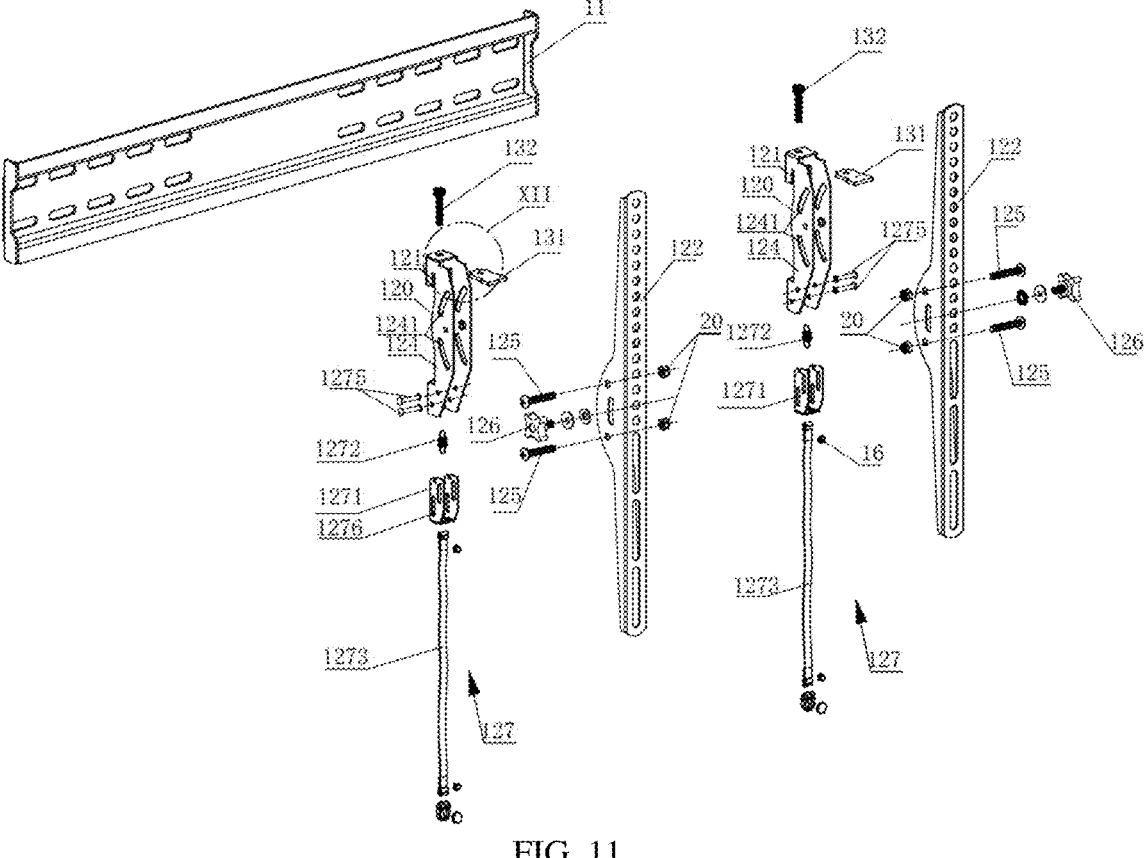
FIG. 11 illustrates an exploded view of the display mounting support in FIG. 10.

FIG. 10 illustrates a schematic view of a three-dimensional structure of a display mounting support 1 in accordance with the other embodiment of the present disclosure; FIG. 11 illustrates an exploded view of the display mounting support in FIG. 10. Different from the previous embodiment, in this embodiment, the adjusting plate 131 is substantially in a shape of a flat plate and is connected to a portion of the hanging assembly 12 located above the hooking portion 121; the adjusting plate 131 defines the threaded hole 1311; the adjusting screw 132 passes through the threaded hole 1311 and rests against the mounting portion 111. The longer the adjusting screw 132 is screwed into the threaded hole 1311, the higher the hanging assembly 12 is lifted by the levelness adjusting member 13.

Therefore, when it is necessary to adjust the levelness of the two hanging assemblies 12, it is sufficient to control the length of the adjusting screw 132 screwed into the threaded hole 1311.

Different from the previous embodiment, in this embodiment, the adjusting plate 131 is inserted into the sidewall 124 and the back plate 123 of the hanging strip 120.

Therefore, the back plate 123 and sidewall 124 can provide sufficient support for the adjusting plate 131, making a connection between the adjusting plate 131 and the hanging strip 120 more stable and reliable, and further increasing an overall load-bearing capacity of the hanging assembly 12.

Figure 12:
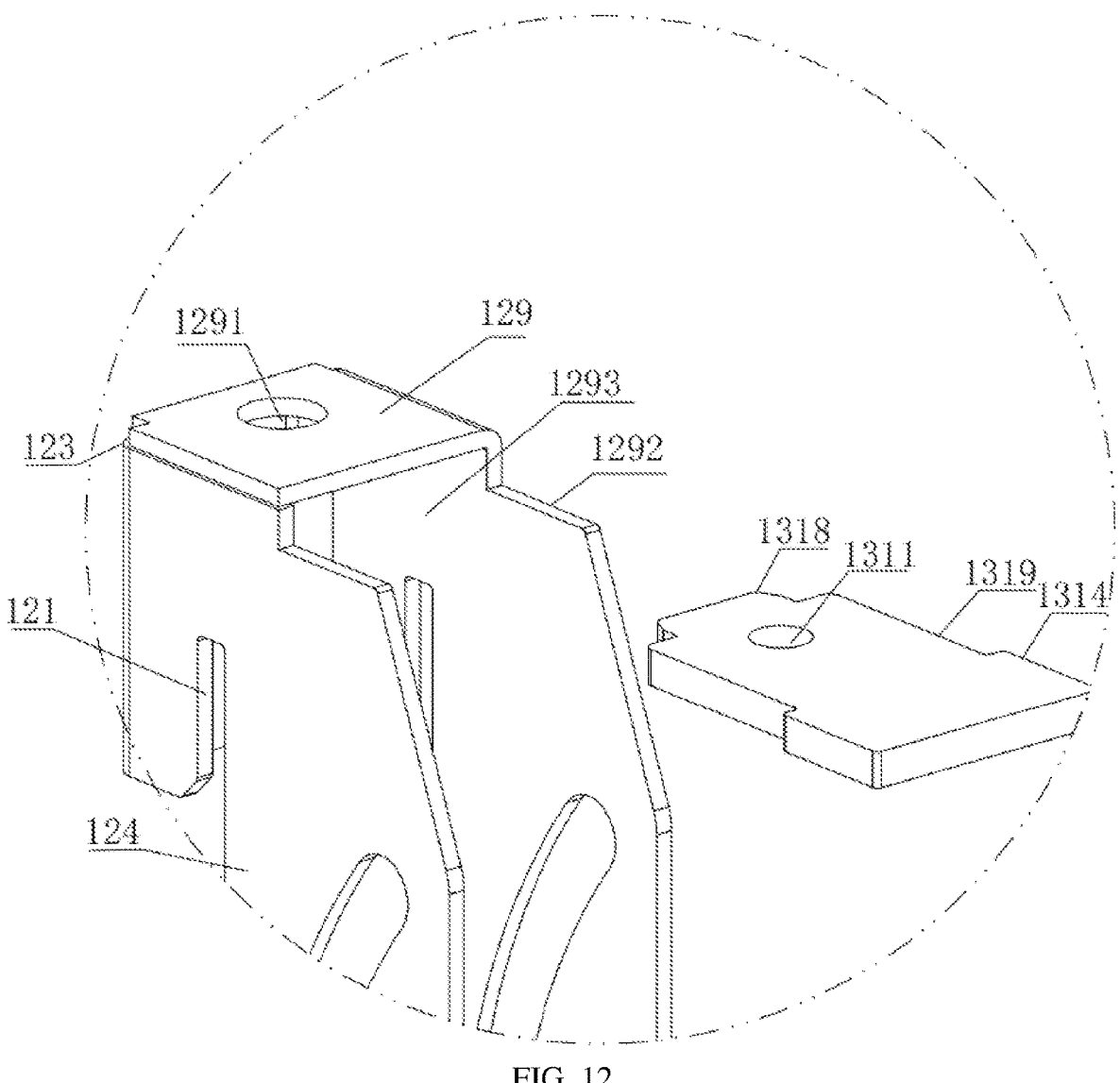
FIG. 12 illustrates a partially enlarged view of FIG. 11 at XII.

Referring to FIGS. 11 and 12 together, different from the previous embodiment, in this embodiment, the hanging strip 120 further includes a top plate 129. The top plate 129 connects top ends of the sidewall 124 and the back plate 123. The top plate 129 defines a second through hole 1291 in the Z-axis direction. The second through hole 1291 is arranged with the threaded hole 1311 in the Z-axis direction. The threaded rod of the adjusting screw 132 passes through the second through hole 1291, threads with the threaded hole 1311 in the adjusting plate 131, and rests against the mounting portion 111 of the wall plate 11.

Therefore, by adding the top plate 129, the overall structural strength of the hanging strip 120 can be increased, which in turn increases the overall load-bearing capacity of the hanging assembly 12.

Figure 13:
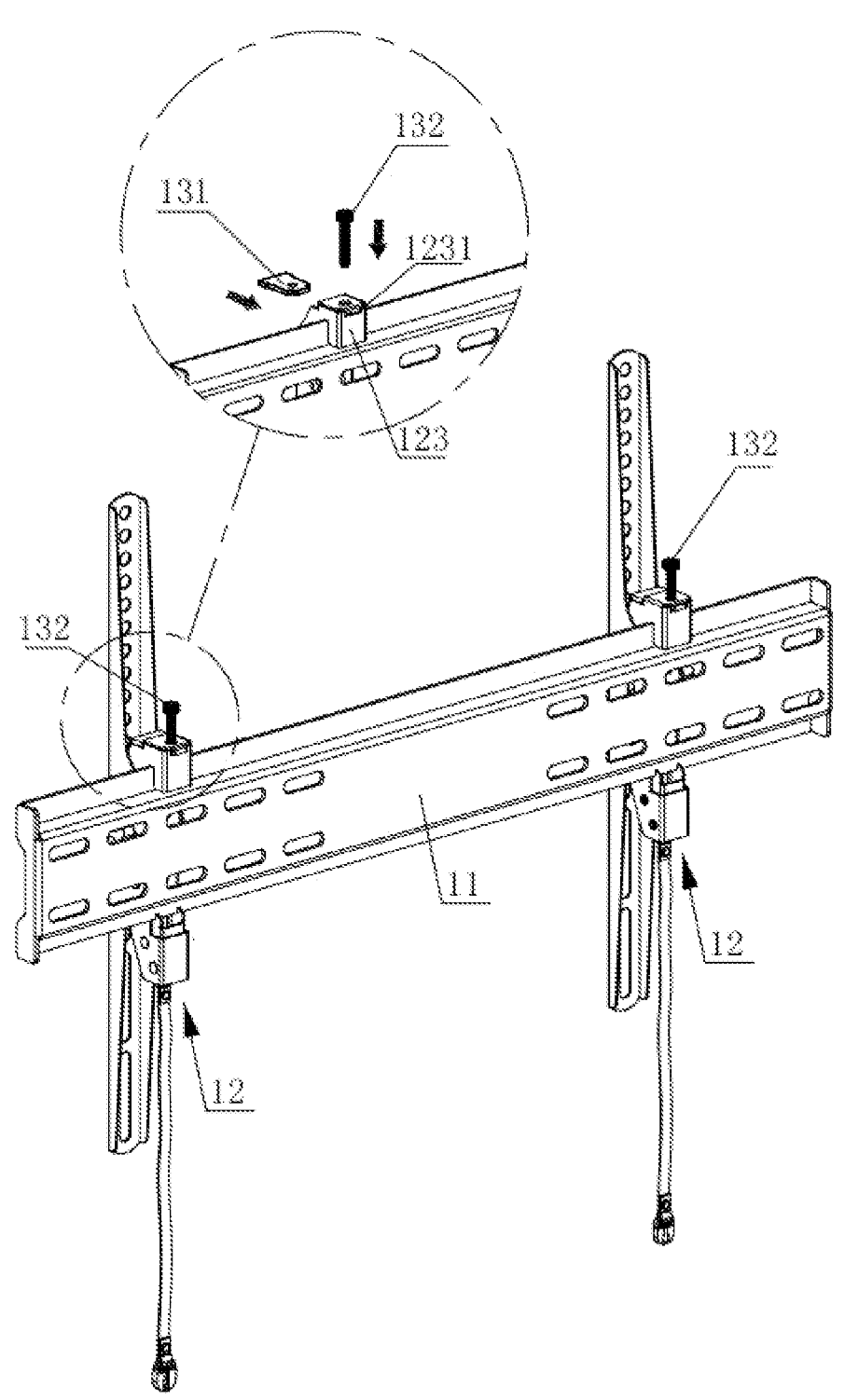
FIG. 13 illustrates a schematic view of the display mounting support in accordance with another embodiment of the present disclosure for adjusting a levelness.

In some embodiments, referring again to FIG. 12, the top plate 129 is connected to a side of the top end of the sidewall 124 close to the back plate 123, and another side of the top end of the sidewall 124 away from the back plate 123 defines a buckle section 1292. Referring also to FIG. 13, the back plate 123 defines a third through hole 1231. The back plate 123 and the sidewall 124 together form an accommodating space 1293. The accommodating space 1293 is interconnected with the third through hole 1231. The adjusting plate 131 includes a first plate section 1318, a second plate section 1319, and a third plate section 1314 sequentially connected. In some embodiments, the length of the first plate section 1318, the second plate section 1319, and the third plate section 1314 are sequentially increased in the X-axis direction. The first plate section 1318 protrudes from the third through hole 1231, the second plate section 1319 is located in the accommodating space 1293, and the third plate section 1314 laps over the buckle section 1292, and the threaded hole 1311 is defined in the second plate section 1319.

Therefore, the back plate 123 is defined with the third through hole 1231, another side of the top end of the sidewall 124 away from the back plate 123 defines the buckle section 1292, and the adjusting plate 131 is designed as a three-section type, the first plate section 1318 extends out from the third through hole 1231, the second plate section 1319 is located in the accommodating space 1293, and the third plate section 1314 is lapped over the buckle section 1292, making the connection between the adjusting plate 131 and the hanging strip 120 more reliable and stable.

Figure 14:
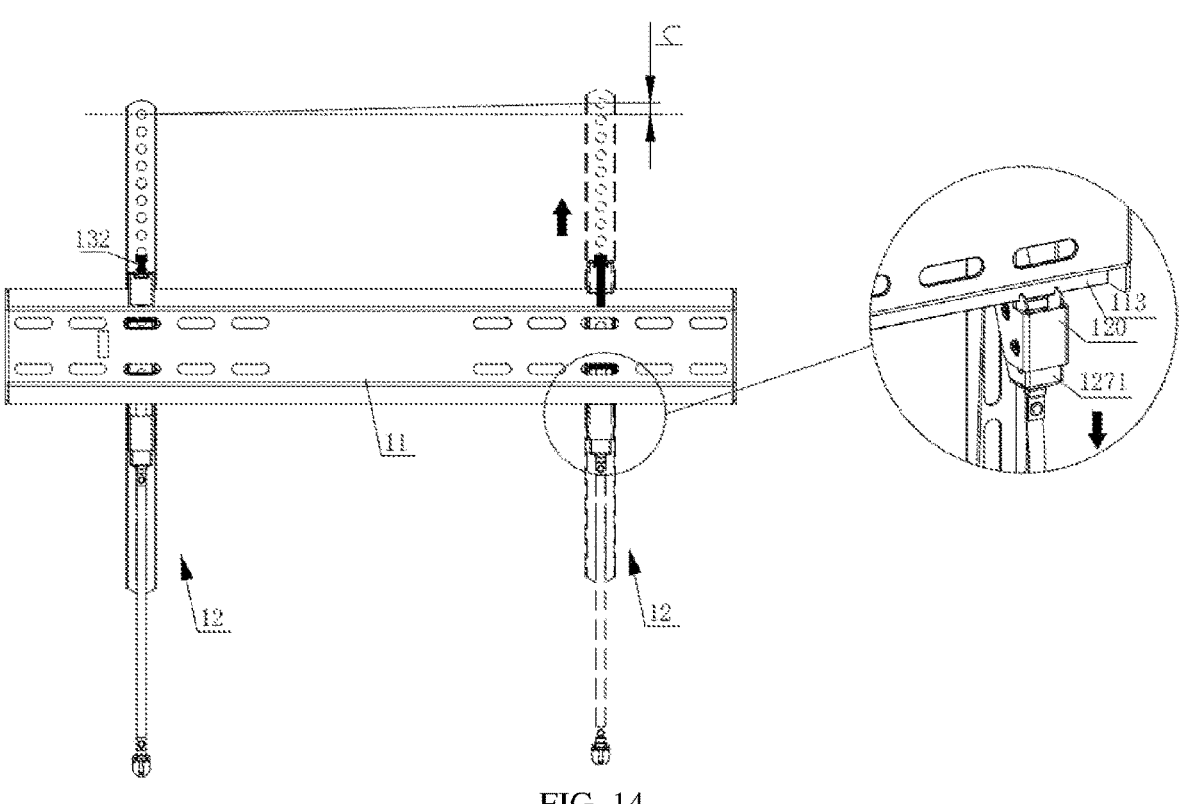
FIG. 14 illustrates a schematic view of the display mounting support in accordance with another embodiment of the present disclosure for adjusting a levelness.

Referring to FIG. 14, when the wall plate 11 is mounted in a state tilted downwardly to the right, the adjusting plate 131 of the levelness adjusting member 13 corresponding to the right-side hanging assembly 12 needs to be lifted upwardly by a height h in order to offset the downwardly tilted height of the right-side of the wall plate 11, so that the two hanging assemblies 12 are in a horizontal state. Therefore, the adjusting screw 132 can be rotated to increase the length of the threaded rod of the adjusting screw 132 screwed into the adjusting plate 131 to the height h, thereby lifting the adjusting plate 131 upwardly by the height h. When the right-side adjusting plate 131 drives the right-side hanging assembly 12 upwardly to lift the height h, the locking plate 1271 is pushed downwardly in a reverse direction and the locking plate 1271 protrudes from the bottom end of the hanging strip 120 by a length that is the sum of the first length and the height h.

Figure 15:
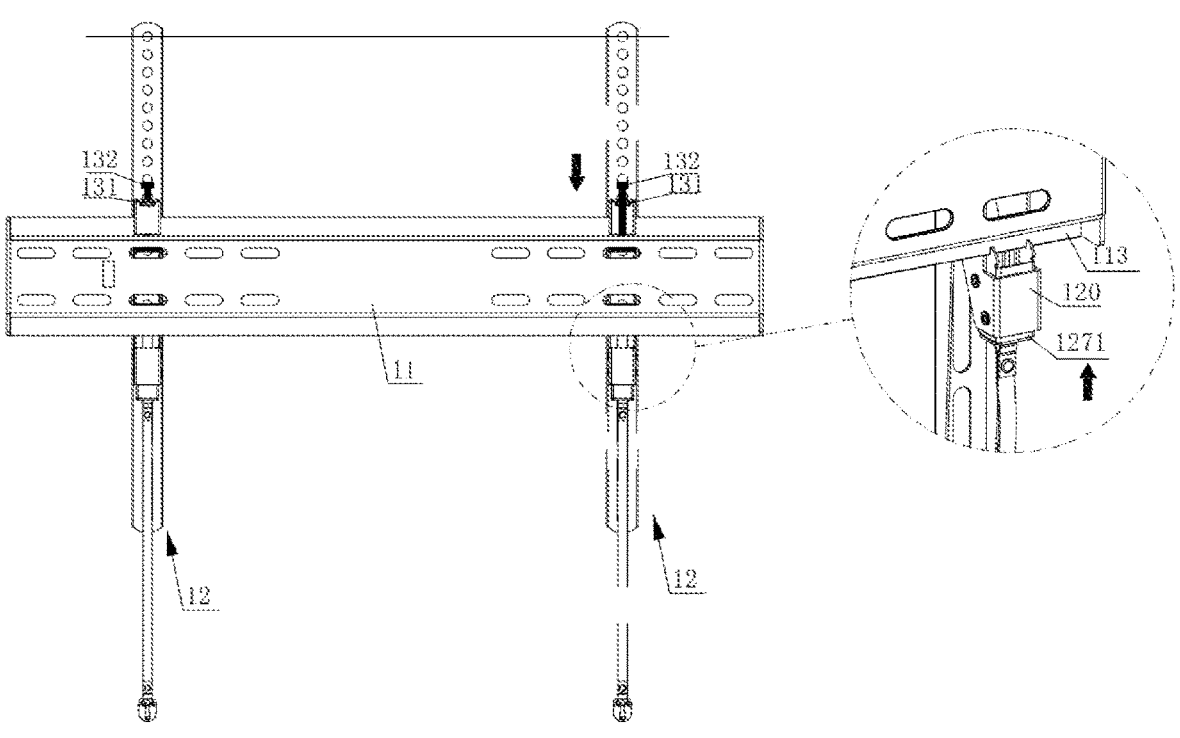
FIG. 15 illustrates a schematic view of the display mounting support in accordance with another embodiment of the present disclosure for adjusting a levelness.

Referring to FIG. 15, which shows an inverse process of FIG. 14, when the adjusting screw 132 is rotated in the reverse direction, the length of the threaded rod of the adjusting screw 132 screwed into the adjusting plate 131 is decreased, the height of the lifted adjusting plate 131 can be reduced, and accordingly, due to the elastic restoring force of the tension spring 1272, the length of the locking plate 1271 protruded from the bottom end of the hanging strip 120 will be correspondingly reduced.

Figure 16:
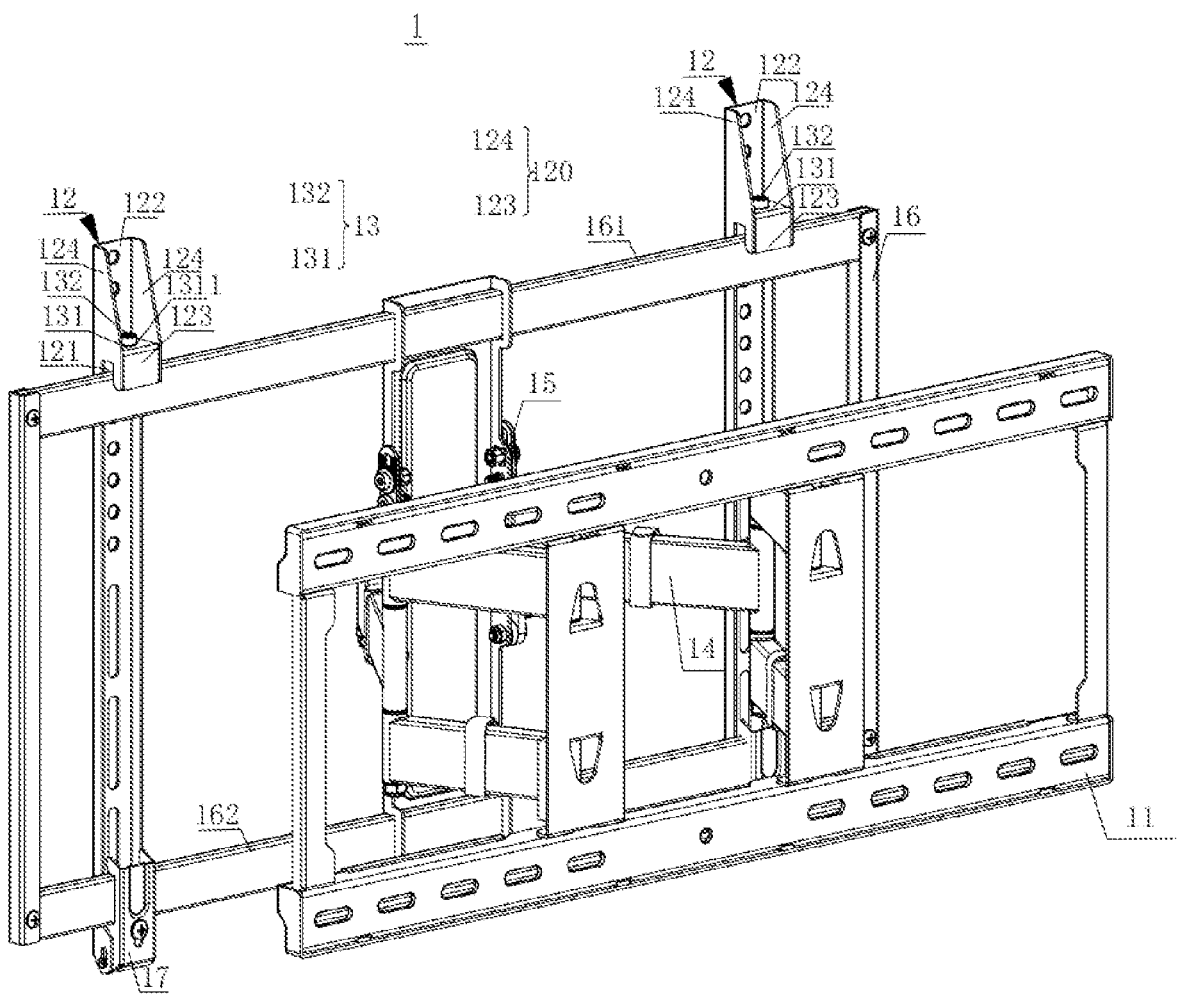
FIG. 16 illustrates a schematic view of a three-dimensional structure of a display mounting support in accordance with yet another embodiment of the present disclosure.

Referring to FIG. 16, FIG. 16 illustrates a schematic view of a three-dimensional structure of a display mounting support in accordance with yet another embodiment of the present disclosure. Different from the previous embodiment, in this embodiment, the display mounting support 1 further comprises a mounting frame 16. The mounting frame 16 includes an upper horizontal tube 161 and a lower horizontal tube 162. The mounting portion 111 is the upper horizontal tube 161, so that hooking portion 121 of the hanging strip 120 is suspended on the upper horizontal tube 161. The adjusting plate 131 is substantially in a shape of a flat plate and is connected to a portion of the hanging assembly 12 located above the hooking portion 121. The adjusting plate 131 defines the threaded hole 1311. The adjusting screw 132 passes through the threaded hole 1311 and rests against to the horizontal tube 161. The longer the adjusting screw 132 is screwed into the threaded hole 1311, the higher the corresponding hanging assembly 12 is lifted up by the levelness adjusting member 13.

Therefore, the hanging assembly 12 of the display mounting support 1 of the present disclosure can be adapted to more kinds of wall plates, and thus adapted to a greater variety of scenarios.

Different from the previous embodiments, in this embodiment, the display mounting support 1 further includes a telescopic frame 14 and a second pitch adjustment member 15. The telescopic frame 14 is connected between the wall plate 11 and the second pitch adjustment member 15. The mounting frame 16 is connected to the second pitch adjustment member 15.

Therefore, the display mounting support 1 in the present disclosure can not only realize horizontal fine adjustment, but also realize pitch angle adjustment and front/back telescoping distance adjustment, which is more abundant in function and can be adapted to more working scenarios.

Different from the previous embodiments, in this embodiment, the sidewall 124 and the hanging rod 122 of the hanging strip 120 are integrally connected, the sidewall 124 is connected between the back plate 123 and the hanging rod 122, and the adjusting plate 131 is connected between portions of the back plate 123, the hanging rod 122, and the sidewall 124 that located above the hooking portion 121.

Therefore, the connection strength of the adjusting plate 131, the hanging strip 120, and the hanging rod 122 can be enhanced to improve an overall structural strength of the hanging assembly 12.

In some embodiments, please referring to FIG. 16 again, and also, the end of the adjusting screw 132, after passing through the threaded hole 1311 of the adjusting plate 131, is also resisted against a top surface of the upper horizontal tube 161.

Figure 17:
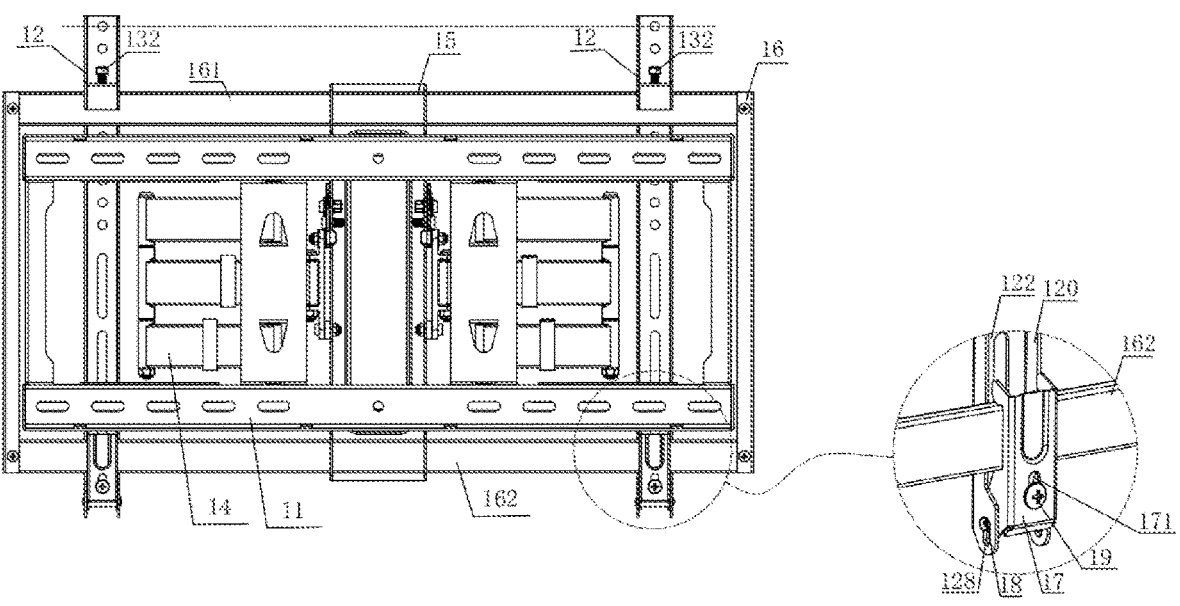
FIG. 17 illustrates a schematic view of the display mounting support in accordance with yet another embodiment of the present disclosure for adjusting a levelness.

In some embodiments, referring to FIG. 17, the display mounting support 1 further includes a pipe clamp 17, a connecting member 18, and a locking member 19. The bottom end of the hanging strip 120 defines a sliding groove 128 along the Z-axis direction. A bottom end of the pipe clamp 17 defines a connecting hole (not shown). The connecting member 18 is slidably connected to the sliding groove 128 and threaded into the connecting hole. The pipe clamp 17 defines a limiting slot 171 along the Z-axis direction. The locking member 19 is threaded into the limiting slot 171 and connected to the hanging rod 122.

Figure 18:
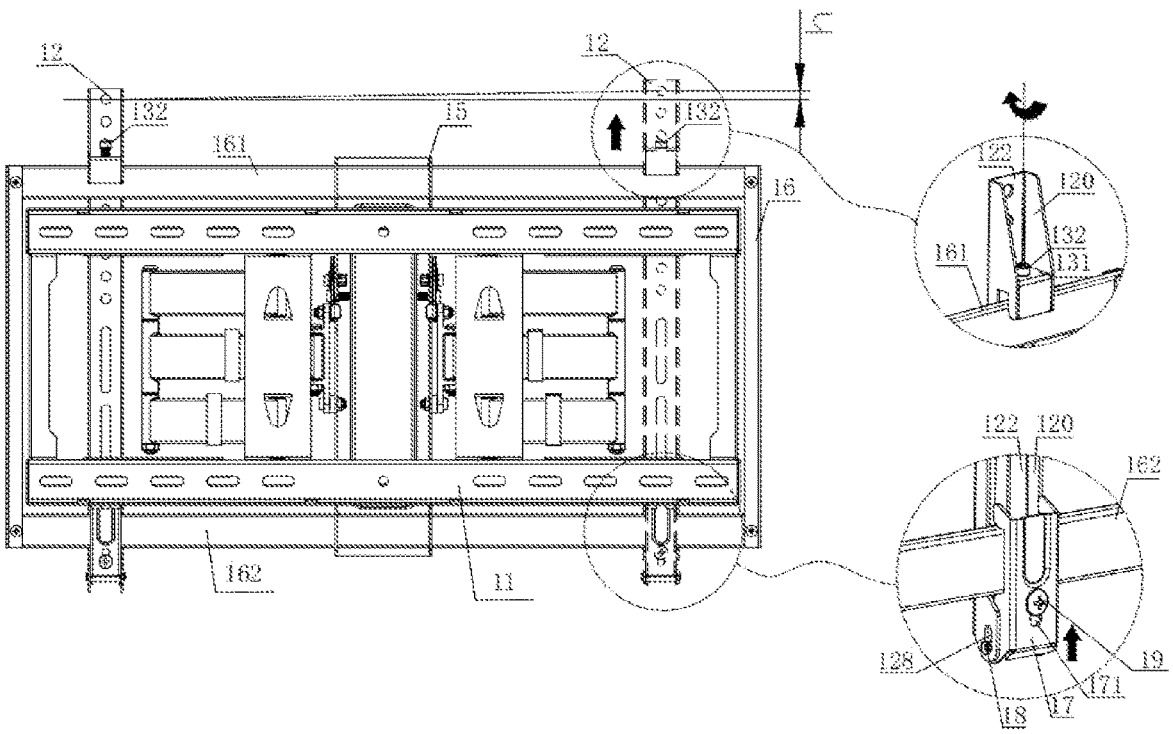
FIG. 18 illustrates a schematic view of the display mounting support in accordance with yet another embodiment of the present disclosure for adjusting a levelness.

Referring to FIG. 18, when the wall plate 11 is installed in a state of tilting downward to the right, the adjusting plate 131 of the levelness adjusting member 13 corresponding to the right-side hanging assembly 12 needs to be lifted upward by a height h in order to offset the height of the right-side downward tilting of the wall plate 11, thereby making the two hanging assemblies 12 in a horizontal state. Therefore, the adjusting screw 132 can be rotated so that the length of the threaded rod of the adjusting screw 132 screwed into the adjusting plate 131 can be increased to the height h, thereby lifting the adjusting plate 131 upwardly by the height h. When the right-side adjusting plate 131 drives the right-side hanging rod 122 and the right-side hanging strip 120 together to lift the height h upwardly, the pipe clamp 17 cannot be moved because it is resisted by the lower horizontal tube 162, and therefore the hanging rod 122 and the hanging strip 120 together move upwardly relative to the upper horizontal tube 161, and the connecting member 18 is located near a bottom end of the sliding groove 128. Since the locking member 19 is fixed relative to the hanging rod 122, the locking member 19 follows the hanging rod 122 to move upwardly, and the locking member 19 is located near a top end of the limiting groove 171.

Figure 19:
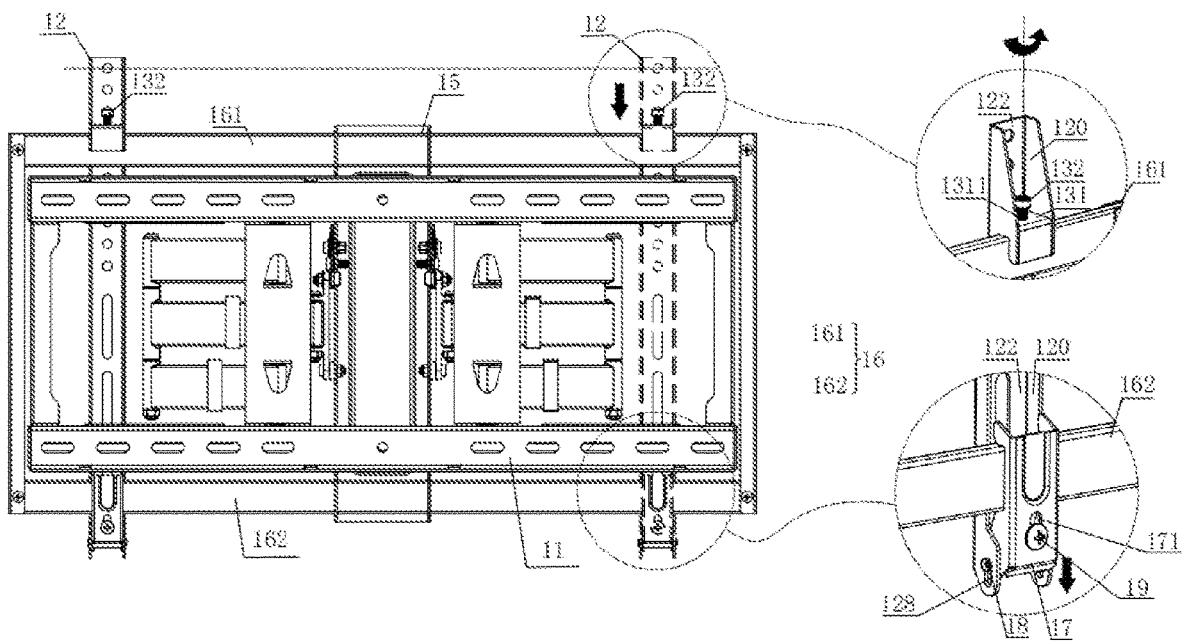
FIG. 19 illustrates a schematic view of the display mounting support in accordance with yet another embodiment of the present disclosure for adjusting a levelness.

Referring to FIG. 19, which shows a reverse process of FIG. 18, when the adjusting screw 132 is rotated in reverse direction, the height of the lifted adjusting plate 131 can be reduced to reduce a length of the threaded rod of the adjusting screw 132 screwed into the adjusting plate 131, and accordingly the locking member 19 follows the hanging rod 122 downwardly within the limiting slot 171, and as the hanging rod 122 and the hanging strip 120 move downwardly, the connecting member 18 correspondingly moves upwardly within the sliding groove 128.

The above description of the technical solution of the subject matter of the present disclosure as well as the corresponding details are described above, and it can be understood that the above description is only at least one embodiment of the technical solution of the subject matter of the present disclosure, and some of the details can also be omitted in its specific implementation.

In addition, in at least one embodiment of the above present disclosure, there are multiple embodiments of the combination of implementation possibilities, various combination programs are limited to space will not be listed. The technical personnel in the field can freely combine the implementation of the above embodiments according to the needs of the specific implementation, in order to obtain a better application experience.

In summary, it can be understood that the present disclosure has the above mentioned excellent characteristics, so that it can be used to enhance the effectiveness of the previous technology has not been practical, and become a very practical value of the product.

The above is only a better example of the present disclosure, and is not intended to limit the present disclosure. Any modification, equivalent substitution or improvement made within the ideas and principles of the present disclosure shall be included in the scope of protection of the present disclosure.

What is claimed is:

1. A display mounting support, wherein the display mounting support comprises:

a wall plate comprising a mounting portion;

two hanging assemblies, one side of each of the two hanging assemblies being connected to a backside of a display screen and the other side of each of the two hanging assemblies defines a hooking portion for suspending on the mounting portion;

two levelness adjusting members respectively corresponding to the two hanging assemblies;

wherein each levelness adjusting member comprises an adjusting plate and an adjusting screw; the adjusting plate defines a threaded hole in a height direction of the display mounting support; a threaded rod of the adjusting screw is threaded to the threaded hole of the adjusting plate, and an end of the threaded rod rests against the mounting portion of the wall plate; the adjusting plate is connected to the corresponding the hanging assembly; a threaded length of the threaded rod of the adjusting screw screwed into the threaded hole of the corresponding adjusting plate is capable of being changed by rotating the corresponding adjusting screw; the adjusting plate is driven to move in the height direction by the adjusting screw; and the adjusting plate moving in the height direction drives the corresponding hanging assembly to move in the height direction to adjust a levelness between the two hanging assemblies.

2. The display mounting support according to claim 1, wherein the hanging assembly comprises a hanging strip and a hanging rod; the hanging strip comprises at least one sidewall; the hanging rod is connected to the at least one sidewall of the hanging strip; the hooking portion is defined on the sidewall; and the adjusting plate is connected to a portion of the sidewall located above the hooking portion.

3. The display mounting support according to claim 2, wherein the hanging strip further comprises a back plate facing the wall plate; the hanging rod is located on one side of the sidewall backing away from the wall plate; the sidewall is connected between the back plate and the hanging rod; and the adjusting plate is connected to portions of the back plate, the hanging rod and the sidewall located above the hooking portion.

4. The display mounting support according to claim 2, wherein the hanging strip further comprises a back plate facing the wall plate; the adjusting plate is connected to between portions of the sidewall and the back plate located above the hooking portion.

5. The display mounting support according to claim 4, wherein the hanging strip comprises a top plate; the top plate connects a top end of the sidewall and a top end of the back plate, the top plate defines a through hole in the height direction, the through hole is arranged with the threaded hole in the height direction, the threaded rod of the adjusting screw passes through the through hole, and threaded to the threaded hole in the adjusting plate and rests against the mounting portion of the wall plate.

6. The display mounting support according to claim 5, wherein the top plate is connected to a side of the top end of the sidewall close to the back plate, and another side of the top end of the sidewall away from the back plate defines a buckle section; the back plate defines a through hole, the back plate, the sidewall and the top plate cooperatively form an accommodating space, the accommodating space is interconnected with the through hole; the adjusting plate comprises a first plate section, a second plate section, and a third plate section sequentially connected, the threaded hole is defined on the second plate section, the first plate section protrudes from the third through hole, the second plate section is located in the accommodating space, and the third plate section laps over the buckle section.

7. The display mounting support according to claim 1, wherein the adjusting plate is mounted to the mounting portion, and the hooking portion of the hanging assembly is mounted to the adjusting plate.

8. The display mounting support according to claim 7, wherein the two adjusting plates are mounted on the mounting portion at intervals along a length direction of the display mounting support; one end of each of the two the adjusting plates is rotationally connected to the mounting portion, and the other end of each of the two the adjusting plates is defined with the threaded hole.

9. The display mounting support according to claim 8, wherein the mounting portion comprises a hanging plate and a supporting plate; the hanging plate is connected to the supporting plate, the adjusting plate comprises a hanging portion and a supporting portion; the supporting portion is connected to the hanging portion; the hanging portion is suspended on the hanging plate; the supporting portion is located above the supporting plate; and the threaded hole is defined on the supporting portion.

10. The display mounting support according to claim 1, wherein the hanging assembly comprises a hanging strip and a hanging rod; the hanging strip comprises at least one sidewall; the hanging rod is connected to the at least one sidewall of the hanging strip; the hooking portion is defined on the sidewall; the hanging assembly further comprises a pull rod assembly; the pull rod assembly comprises a locking plate, a tension spring and a pull cord; the locking plate is located adjacent to a bottom end of the wall plate, the locking plate defines an opening on a side toward a top end of the wall plate; the locking plate is slidably connected to a bottom end of the hanging strip, one end of the tension spring is connected to the bottom end of the hanging strip, the other end of the tension spring is connected to the locking plate, and the pull cord is connected to the locking plate.

11. The display mounting support according to claim 10, wherein the pull rod assembly further comprises a guiding member; one of the locking plate and the bottom end of the hanging strip defines a guiding groove, the other of the locking plate and the bottom end of the hanging strip defines a fixing hole; and the guiding member is slidably connected to the guide groove and connected to the fixing hole.

12. The display mounting support according to claim 1, wherein the hanging assembly comprises a hanging strip and a hanging rod; the hanging strip comprises at least one sidewall; the hanging rod is connected the at least one sidewall of the hanging strip; the hooking portion is defined on the at least one sidewall; the at least one sidewall of the hanging strip defines a first pitch adjustment slot; the display mounting support also comprises a first pitch adjustment member; the hanging rod is slidably connected within the first pitch adjustment slot through the first pitch adjustment member.

13. The display mounting support according to claim 1, wherein the hanging assembly comprises a hanging strip and a hanging rod; the hanging strip comprises at least one sidewall; the hanging rod is connected to the at least one sidewall of the hanging strip; the hooking portion is defined on the at least one sidewall; the display mounting support further comprises a mounting frame; the mounting frame comprises an upper horizontal tube and a lower horizontal tube; the mounting portion is provided on the upper horizontal tube; the display mounting support further comprises a pipe clamp, a connecting member and a locking member; the pipe clamp is rotatably connected to a bottom end of the hanging strip by the connecting member; and the pipe clamp and the hanging strip cooperatively form a space for locking the lower horizontal tube.

14. The display mounting support according to claim 13, wherein one of the bottom end of the hanging strip and the pipe clamp defines a sliding groove along the height direction, the other of the bottom end of the hanging strip and the pipe clamp defines a connecting hole; the connecting member is slidably connected within the sliding groove and is connected within the connecting hole; the pipe clamp defines a limiting slot along the height direction, and the locking member is slidably connected within the limiting slot and connected to the hanging rod.

15. A display mounting support, wherein the display mounting support comprises:

a wall plate comprising a top end and a bottom end opposite to the top end, the top end comprising a mounting portion;

two hanging assemblies, each of the two hanging assemblies comprising a hanging strip and a hanging rod, wherein the hanging rod is connected to the hanging strip, the hanging strip comprises at least one sidewall, a top plate, and a back plate facing the wall plate; the top plate connects a top end of the sidewall and a top end of the back plate; the sidewall defines a hooking portion, the hooking portion is configured to suspend on the mounting portion; the top plate defines a through hole along a height direction of the display mounting support;

wherein the hanging assembly further comprises a pull rod assembly; the pull rod assembly comprises a locking plate, a tension spring and a pull cord; the locking plate is located adjacent to a bottom end of the wall plate; the locking plate defines an opening toward a top end of the wall plate; the locking plate is slidably connected to a bottom end of the hanging strip, one end of the tension spring is connected to the bottom end of the hanging strip, the other end of the tension spring is connected to the locking plate, and the pull cord is attached to the locking plate.

16. The display mounting support according to claim 15, wherein the at least one sidewall of the hanging strip further defines a first pitch adjustment slot; the display mounting support further comprises a first pitch adjustment member; the hanging rod is slidably connected to the first pitch adjustment slot through the first pitch adjustment member.

17. The display mounting support according to claim 15, wherein the pull rod assembly further comprises a guiding member; one of the locking plate and the bottom end of the hanging strip defines a guiding groove, the other of the locking plate and the bottom end of the hanging strip defines a fixing hole; the guiding member is slidably connected within the guide groove and connected to the fixing hole.

18. The display mounting support according to claim 15, wherein the display mounting support further comprises two levelness adjusting members;

wherein the two the levelness adjusting members corresponding to two the hanging assemblies respectively, each the levelness adjusting member comprises an adjusting plate and an adjusting screw; the adjusting plate defines a threaded hole in the height direction of the display mounting support; a threaded rod of the adjusting screw passes through the through hole and threaded to the threaded hole in the adjusting plate; an end of the adjusting screw rests against the mounting portion of the wall plate, the adjusting plate is connected to the corresponding hanging strip;

wherein the threaded rod of the adjusting screw screwed into the threaded hole on the corresponding adjusting plate is capable of being changed by rotating the corresponding adjusting screw; the adjusting plate is driven to move in the height direction by the adjusting screw; and the adjusting plate moving in the height direction drives the corresponding hanging assembly to move in the height direction to adjust a levelness between the two hanging assemblies.

19. The display mounting support according to claim 18, wherein the top plate is connected to a side of the top end of the sidewall close to the back plate, and another side of the top end of the sidewall away from the back plate defines a buckle section; the back plate defines a through hole, the back plate, the sidewall and the top plate cooperatively form an accommodating space; the accommodating space is interconnected with the through hole; the adjusting plate comprises a first plate section, a second plate section, and a third plate section sequentially connected; the first plate section protrudes from the third through hole; the second plate section is located in the accommodating space; and the third plate section laps over the buckle section, the threaded hole is defined on the second plate section.

* * * * *